US012464089B2

(12) United States Patent
Lan et al.

(10) Patent No.: US 12,464,089 B2
(45) Date of Patent: Nov. 4, 2025

(54) INFORMATION PROCESSING METHOD, DEVICE, SYSTEM, STORAGE MEDIUM, AND COMPUTER PROGRAM PRODUCT

(71) Applicant: HUAWEI TECHNOLOGIES CO., LTD., GuangDong (CN)

(72) Inventors: Huicai Lan, Shenzhen (CN); Hua Yin, Shenzhen (CN); Shuiping Qiu, Shenzhen (CN); Yong Shi, Shenzhen (CN); Sining Wei, Shenzhen (CN); Zhendong Liu, Dongguan (CN); Hao Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 18/071,166

(22) Filed: Nov. 29, 2022

(65) Prior Publication Data

US 2023/0091539 A1 Mar. 23, 2023

Related U.S. Application Data

(63) Continuation of application No. PCT/CN2020/142042, filed on Dec. 31, 2020.

(30) Foreign Application Priority Data

May 30, 2020 (CN) .......................... 202010480648.9

(51) Int. Cl.
*H04N 7/15* (2006.01)
*G06F 3/14* (2006.01)
*H04L 12/18* (2006.01)

(52) U.S. Cl.
CPC ........... *H04N 7/152* (2013.01); *G06F 3/1454* (2013.01); *H04L 12/1822* (2013.01)

(58) Field of Classification Search
CPC .......................... H04N 7/152; H04L 12/1822
See application file for complete search history.

(56) References Cited

U.S. PATENT DOCUMENTS

| 2011/0279634 A1 | 11/2011 | Periyannan et al. |
| 2015/0149929 A1 | 5/2015 | Shepherd et al. |

(Continued)

FOREIGN PATENT DOCUMENTS

| CN | 102883134 A | 1/2013 |
| CN | 102883135 A | 1/2013 |

(Continued)

*Primary Examiner* — Amal S Zenati
(74) *Attorney, Agent, or Firm* — Rimon PC

(57) ABSTRACT

Embodiments of this application provide an information processing method, a device, a system, a storage medium, and a computer program product that relate to a web conferencing technology. In the method, a plurality of users may join a web conference by using a plurality of participating terminal devices. In addition, screen sharing is performed by using a web conferencing system. Therefore, the plurality of participating terminal devices in the conference may display, on screens of the plurality of participating terminal devices, information shared by the at least two sharing terminal devices. In this manner, the web conferencing system supports screen sharing performed by a plurality of sharing terminal devices at a same moment, and each sharing terminal device can control the screen sharing. This facilitates information sharing between the pluralities of users, and improves communication efficiency between the users.

18 Claims, 15 Drawing Sheets

(56) References Cited

U.S. PATENT DOCUMENTS

2015/0160913 A1 6/2015 Lee
2016/0321025 A1* 11/2016 Ikeda .................... G06F 3/1454
2021/0181938 A1* 6/2021 Hassan ................ G06F 3/1454

FOREIGN PATENT DOCUMENTS

| CN | 104020968 A | 9/2014 |
| CN | 104038722 A | 9/2014 |
| CN | 106209523 A | 12/2016 |

* cited by examiner

INFORMATION PROCESSING METHOD, DEVICE, SYSTEM, STORAGE MEDIUM, AND COMPUTER PROGRAM PRODUCT

CROSS-REFERENCE TO RELATED APPLICATIONS

This application is a continuation of International Application No. PCT/CN2020/142042, filed on Dec. 31, 2020, which claims priority to Chinese Patent Application No. 202010480648.9, filed on May 30, 2020. The disclosures of the aforementioned applications are hereby incorporated by reference in their entireties.

TECHNICAL FIELD

Embodiments of this application generally relate to communications technologies, and in particular, to an information processing method, a device, a system, a storage medium, and a computer program product.

BACKGROUND

A web conferencing system, also referred to as a remote collaborative office system, is a multimedia conferencing platform that uses the internet as a medium. The web conferencing system can share data between a pluralities of users in different locations through the internet. The users can ignore time and region restrictions, and achieve face-to-face communication through the internet. Currently, with an increase in enterprise users, remote office is becoming more common for enterprises. Therefore, to improve work efficiency, many enterprises choose to use the web conferencing system to implement collaborative work of a plurality of users using a plurality of terminal devices in a plurality of regions (for example, different office areas and different cities).

A common web conferencing system is a web conferencing system having an application (APP) version. To be specific, a user may log in to the web conferencing system to join a web conference by using the APP, of the web conferencing system, installed on a terminal device. For example, a process of product research and development (for example, product requirements, product designs, and the like) may require discussion and review by a plurality of users distributed in different locations. In this scenario, the user can use the APP version of the web conferencing system, installed on the terminal of the user, to conduct discussion and review between a plurality of users, a plurality of terminal devices, and a plurality of regions. This improves work efficiency.

However, a web conferencing system in a conventional technology may only support a single-person screen sharing function. To be specific, when a plurality of users use the web conferencing system for discussion and communication, only one user can share a screen at a same moment. In other words, at the same moment, participants can view only one screen shared by the user, resulting in relatively low efficiency of communication between the users.

SUMMARY

This application provides an information processing method, a device, a system, a storage medium, and a computer program product. When a plurality of users and a plurality of terminal devices join a web conference, this information processing method implements information sharing between the plurality of users and the plurality of terminal devices.

According to a first aspect, this application provides an information processing method. The method may be applied to a web conferencing system, and the method may include the web conferencing system may receive a data stream of screen sharing information transmitted by at least two sharing terminal devices in a screen sharing mode. Each of the at least two sharing terminal devices can control screen sharing (e.g., the screen sharing mode). It should be understood that the sharing terminal device herein may be any participating terminal device in a conference. In other words, any participating terminal device in the conference may initiate the control of screen sharing, and a plurality of participating terminal devices in the conference may simultaneously share information on screens of the plurality of participating terminal devices. The control of screen sharing described herein may be control related to screen sharing, for example, initiating screen sharing, ending screen sharing, viewing or stopping information shared by another participating terminal device, or the like. Optionally, the screen sharing information transmitted by the sharing terminal device may be any information, for example, a document, a desktop of the sharing terminal device, an image, an application, a browser, or the like, displayed in a user interface of the sharing terminal device.

Correspondingly, the web conferencing system may distribute the data stream of the screen sharing information of the at least two sharing terminal devices to the plurality of participating terminal devices in the conference, to enable the plurality of participating terminal devices to display the screen sharing information shared by the at least two sharing terminal devices. The plurality of participating terminal devices include the at least two sharing terminal devices.

According to the foregoing method, when a plurality of users join a web conference by using the web conferencing system, the plurality of users may simultaneously share screens by using the web conferencing system, without waiting for another user in the conference to complete screen sharing. In other words, the web conferencing system can implement information sharing between a plurality of users and a plurality of terminal devices, so that information is conveniently shared between the plurality of users at the same time, and communication efficiency between the users is improved.

In a possible implementation of the first aspect, the web conferencing system may be a web conferencing system of a web version (e.g., utilizing an internet browser). In this possible implementation, a user may log in to the web conferencing system by using a web browser on a terminal device, without additionally installing an APP or additionally configuring hardware used for a web conference. This expands an application scenario of the method, and reduces implementation costs of the method.

In a possible implementation of the first aspect, the participating terminal devices in the conference include a chair terminal device. Before receiving the data stream of the screen sharing information from the sharing terminal devices, the web conferencing system may implement, in the following manner, that one of the at least two the sharing terminal devices enters the screen sharing mode.

For example, one of the at least two sharing terminal devices enters the screen sharing mode according to a control instruction of the chair terminal device. In an example, a first sharing request instruction from the chair terminal device is received. The first sharing request instruction requests the sharing terminal device to share a screen. The first sharing request instruction is sent to the sharing terminal device. A first sharing response instruction sent by the sharing terminal device is received. The first sharing response instruction is used to indicate that the sharing terminal device agrees to share the screen. The first sharing response instruction is sent to the chair terminal device, and the sharing terminal device is controlled to enter the screen sharing mode.

For another example, the sharing terminal device enters the screen sharing mode according to a control instruction of one of the at least two sharing terminal devices. In an example, a second sharing request instruction from the sharing terminal device is received. The second sharing request instruction requests to share a screen. The second sharing request instruction is sent to the chair terminal device. A second sharing response instruction sent by the chair terminal device is received. The second sharing response instruction is used to indicate that the chair terminal device agrees with the sharing terminal device on sharing the screen. The second sharing response instruction is sent to the sharing terminal device, and the sharing terminal device is controlled to enter the screen sharing mode. Alternatively, for example, a sharing instruction from the sharing terminal device is received. The sharing instruction instructs the sharing terminal device to start to share the screen. The sharing terminal device is controlled to enter the screen sharing mode.

The sharing terminal device enters the screen sharing mode in any one of the foregoing example manners. In this way, the sharing terminal device may share the screen sharing information of the sharing terminal device with participants in the conference. This expands an implementation and an application scenario of the screen sharing method.

In a possible implementation of the first aspect, before the data stream of the screen sharing information from the sharing terminal devices is received, the method further includes establishing a data transmission channel with a participating terminal device of the plurality of participating terminal devices. For example, a network connection is established to the participating terminal device, and a display parameter and a transmission parameter of the participating terminal device are obtained. Then, the data transmission channel is established with the participating terminal device based on the display parameter and the transmission parameter of the participating terminal device. In this way, when subsequently distributing, to the participating terminal device, the data stream of the screen sharing information of all the sharing terminal devices in the conference, the web conferencing system may process the distributed data stream based on the display parameter and the transmission parameter of the participating terminal device, to ensure a display effect and transmission efficiency of the participating terminal device.

It should be understood that, the data transmission channel may be established with the participating terminal device after the sharing terminal device enters the screen sharing mode, or before the sharing terminal device enters the screen sharing mode (for example, when the participating terminal device joins the conference, the data transmission channel is established with the participating terminal device), or synchronously when the sharing terminal device enters the screen sharing mode. This is not limited to some embodiments.

In a possible implementation of the first aspect, the method further includes controlling, according to a comment instruction of a first participating terminal device for a target object, the plurality of participating terminal devices to enter a comment mode of the target object. The comment instruction is used to request to comment on the target object. The first participating terminal device herein is any one of the plurality of participating terminal devices. For example, a drawing board is generated according to the comment instruction, and an image, of the target object, used to be rendered to the drawing board is obtained. Then, the comment instruction, the drawing board, and the image of the target object are sent to the plurality of participating terminal devices, to enable the plurality of participating terminal devices to enter the comment mode of the target object. Alternatively, the comment instruction is sent to the plurality of participating terminal devices, to enable the plurality of participating terminal devices to generate drawing boards. An image of the target object that is used to be rendered to the drawing board is obtained and the image of the target object is rendered to the drawing board, thereby entering the comment mode of the target object. Alternatively, an image of the target object that is used to be rendered to a drawing board is obtained according to the comment instruction. The obtained image of the target object that is used to be rendered to the drawing board is sent to the plurality of participating terminal devices, to enable the plurality of participating terminal devices to generate the drawing boards. The image of the target object is rendered to the drawing board, to enter the comment mode of the target object. In this possible implementation, when a plurality of users join a web conference by using the web conferencing system, the plurality of users may comment online on information shared in the conference. This improves communication efficiency between the users.

In a possible implementation of the first aspect, the method further includes receiving, from a second participating terminal device, comment information of the target object. The method further includes sending the comment information to the plurality of participating terminal devices. For example, the comment information includes a start location of a comment on the image of the target object, an end location of the comment on the image of the target object, and a type of the comment. Optionally, the comment information further includes at least one of the following: the drawing board, the image of the target object, or an identifier of a user that comments on the image of the target object.

It should be understood that the second participating terminal device herein is any one of the plurality of participating terminal devices. The second participating terminal device may be the same as or different from the first participating terminal device. In other words, a terminal device that enables the plurality of participating terminal devices to enter the comment mode of the target object may be the same as or different from a terminal device that comments on the target object.

In this possible implementation, when a plurality of users join a web conference by using the web conferencing system, the plurality of users may comment online on information shared in the conference. This improves communication efficiency between the users.

In a possible implementation of the first aspect, the method further includes storing the comment information in a structured manner. For example, that the comment information is stored in the structured manner may include, that when the comment information is stored, an identifier (ID) is allocated to each object in the comment information. For example, the comment information includes the drawing board, the image of the target object, the identifier of the user that comments on the image of the target object, the start location of the comment on the image of the target object, the end location of the comment on the image of the target object, and the type of the comment. When the comment information is stored in the structured manner, an ID is allocated to the comment information, an ID is allocated to the drawing board, and an ID is allocated to the image of the target object. Whether a separate ID is allocated to other content included in the comment, information may be determined based on a query requirement of the user. In other words, when the comment information is stored in this structured manner, content, included in the comment information, to which a separate ID is specifically allocated may be determined based on a subsequent query requirement of the user. For example, if the user has a query requirement for the type of the comment, the separate ID may be allocated to the type of the comment when the comment information is stored.

According to this implementation, when a plurality of users join a web conference by using the web conferencing system, if a user comments on information shared in the conference, the comment information may be stored in the structured manner. This facilitates tracing, reverse locating, and viewing of the comment information, and improves work efficiency between the users.

Optionally, in some aspects, this application further provides an information processing method. The method may be applied to a web conferencing system. The method may include receiving a data stream of screen sharing information transmitted by at least two sharing terminal devices and distributing the data stream of the screen sharing information of the at least two sharing terminal devices to a plurality of participating terminal devices in a conference. This method enables the plurality of participating terminal devices to display the information shared by the at least two sharing terminal devices, where the plurality of participating terminal devices include the at least two sharing terminal devices. In this possible implementation aspect, with reference to the information processing method according to the first aspect or the possible implementations of the first aspect, multi-screen sharing, online commenting, structured storage of comment information, and the like may be implemented. This improves work efficiency between users.

Optionally, in some aspects, this application further provides an information processing method. The method may be applied to a web conferencing system, and the method may include receiving screen information shared by a plurality of terminal devices and distributing the screen information shared by the plurality of terminal devices to a participating terminal device in a conference. This method enables the participating terminal device to implement multi-screen sharing. In this possible implementation aspect, with reference to the information processing method according to the first aspect or the possible implementations of the first aspect, multi-screen sharing, online commenting, structured storage of comment information, and the like may be implemented. This improves work efficiency between users.

According to a second aspect, this application provides an information processing method. The method may be applied to a participating terminal device in a web conferencing system, and the method may include receiving a data stream that is of screen sharing information of at least two sharing terminal devices in a conference and that is distributed by the web conferencing system, where each of the at least two sharing terminal devices is capable of controlling screen sharing. The method may further include displaying, based on the data stream of the screen sharing information of the at least two sharing terminal devices, the information shared by the at least two sharing terminal devices.

According to the foregoing method, when a plurality of users join a web conference by using the web conferencing system, the plurality of users may simultaneously share screens by using the web conferencing system, without waiting for another user in the conference to complete screen sharing. In other words, the web conferencing system can implement information sharing between a plurality of users and a plurality of terminal devices, so that information is conveniently shared between the plurality of users at the same time, and communication efficiency between the users is improved.

In a possible implementation of the second aspect, that the information shared by the at least two sharing terminal devices is displayed based on the data stream of the screen sharing information of the at least two sharing terminal devices includes rendering the data stream of the screen sharing information of the sharing terminal devices to cards corresponding to the sharing terminal devices. The method may further include displaying, in a user interface of the participating terminal device, the cards corresponding to the sharing terminal devices.

In a possible implementation of the second aspect, after the cards corresponding to the sharing terminal devices are displayed in the user interface of the participating terminal device, the method further includes adjusting display of a first card based on an operation performed by a user on the first card in the user interface of the participating terminal device, where the first card is any one of the cards corresponding to the sharing terminal devices. For example, the operation performed by the user on the first card in the user interface of the participating terminal device includes any one of the following: shrinking the first card, enlarging the first card, moving the first card, or closing the first card.

In this possible implementation, the user may adjust, in the user interface of the participating terminal device based on a requirement of the user, a display effect of displaying information shared by a plurality of sharing terminal devices. This improves user experience.

According to a third aspect, this application provides an information processing method. The method includes when distributing a data stream of screen sharing information of at least one sharing terminal device of the at least two sharing terminal devices to a plurality of participating terminal devices in a conference, controlling, according to a comment instruction of a first participating terminal device for a target object, the plurality of participating terminal devices to enter a comment mode of the target object, thereby enabling the plurality of participating terminal devices to render an image of the target object on a drawing board. The comment instruction is used to request to comment on the target object, the first participating terminal device is any one of the plurality of participating terminal devices, and the target object includes the screen sharing information of the at least one sharing terminal device.

For example, the drawing board is generated according to the comment instruction, and the image of the target object that is used to be rendered to the drawing board is obtained. Then, the comment instruction, the drawing board, and the image of the target object are sent to the plurality of participating terminal devices, thereby enabling the plurality of participating terminal devices to enter the comment mode of the target object. Alternatively, the comment instruction is sent to the plurality of participating terminal devices, to enable the plurality of participating terminal devices to generate drawing boards. The image of the target object that is used to be rendered to the drawing board is obtained, and the image of the target object is rendered to the drawing board, thereby entering the comment mode of the target object. Alternatively, the image of the target object that is used to be rendered to the drawing board is obtained according to the comment instruction. The obtained image of the target object that is used to be rendered to the drawing board is sent to the plurality of participating terminal devices, to enable the plurality of participating terminal devices to generate the drawing boards. The image of the target object is rendered to the drawing board, thereby entering the comment mode of the target object.

According to the method, when a plurality of users join a web conference by using a web conferencing system, the plurality of users may comment, online, on information shared in the conference. This improves communication efficiency between the users.

In a possible implementation of the third aspect, the method further includes receiving, from a second participating terminal device, comment information of the target object, and sending the comment information to the plurality of participating terminal devices. For example, the comment information includes a start location of a comment on the image of the target object, an end location of the comment on the image of the target object, and a type of the comment. Optionally, the comment information further includes at least one of the following: the drawing board, the image of the target object, or an identifier of a user that comments on the image of the target object.

It should be understood that the second participating terminal device herein is any one of the plurality of participating terminal devices. The second participating terminal device may be the same as or different from the first participating terminal device. In other words, a terminal device that enables the plurality of participating terminal devices to enter the comment mode of the target object may be the same as or different from a terminal device that comments on the target object.

In this possible implementation, when a plurality of users join a web conference by using a web conferencing system, the plurality of users may comment online on information shared in the conference. This improves communication efficiency between the users.

In a possible implementation of the third aspect, the method further includes storing the comment information in a structured manner. For example, that the comment information is stored in the structured manner may include that when the comment information is stored, an ID is allocated to each object in the comment information. For example, the comment information includes the drawing board, the image of the target object, the identifier of the user that comments on the image of the target object, the start location of the comment on the image of the target object, the end location of the comment on the image of the target object, and the type of the comment. When the comment information is stored in the structured manner, an ID is allocated to the comment information, an ID is allocated to the drawing board, and an ID is allocated to the image of the target object. Whether a separate ID is allocated to other content included in the comment information may be determined based on a query requirement of a user. In other words, when the comment information is stored in the structured manner, content, included in the comment information, to which a separate ID is specifically allocated may be determined based on a subsequent query requirement of a user. For example, if the user has a query requirement for the type of the comment, the separate ID may be allocated to the type of the comment when the comment information is stored.

According to this implementation, when a plurality of users join a web conference by using a web conferencing system, if a user comments on information shared in the conference, the comment information may be stored in the structured manner. This facilitates tracing, reverse locating, and viewing of the comment information, and improves work efficiency between the users.

According to a fourth aspect, this application provides an information processing method. The method includes controlling, according to a comment instruction of a first participating terminal device for a target object, a plurality of participating terminal devices to enter a comment mode of the target object. In some embodiments, the comment instruction is used to request to comment on the target object, the first participating terminal device is any one of the plurality of participating terminal devices, and the target object includes screen sharing information of at least one sharing terminal device of the at least two sharing terminal devices or a whiteboard in a web conferencing system. The method further includes receiving, from a second participating terminal device, comment information of the target object, and storing the comment information in a structured manner. The second participating terminal device herein is any one of the plurality of participating terminal devices.

When the comment information is stored in the structured manner, content, included in the comment information, to which a separate ID is specifically allocated may be determined based on a subsequent query requirement of a user. Details are not described herein again.

According to the method, when a plurality of users join a web conference by using a web conferencing system, if a user comments on information shared in the conference, the comment information may be stored in the structured manner. This facilitates tracing, reverse locating, and viewing of the comment information, and improves work efficiency between the users.

According to a fifth aspect, this application provides a web conferencing system. The system includes a sharing apparatus and a transmission apparatus. Optionally, the system may further include at least one of the following: a user interface apparatus, a comment apparatus, a data management apparatus, and a plurality of participating terminal devices.

The sharing apparatus is configured to receive, by using the transmission apparatus, a data stream of screen sharing information transmitted by at least two sharing terminal devices in a screen sharing mode, and distribute, by using the transmission apparatus, the data stream of the screen sharing information of the at least two sharing terminal devices to a plurality of participating terminal devices in a conference, thereby enabling the plurality of participating terminal devices to display the information shared by the at least two sharing terminal devices. Each of the at least two sharing terminal devices can control screen sharing, and the plurality of participating terminal devices include the at least two sharing terminal devices.

In a possible implementation of the fifth aspect, the web conferencing system is a web conferencing system of a web version.

In a possible implementation of the fifth aspect, the participating terminal devices in the conference include a chair terminal device and the system further includes the user interface apparatus.

For example, the sharing apparatus is further configured to before receiving, by using the transmission apparatus, the data stream of the screen sharing information transmitted by the at least two sharing terminal devices in the screen sharing mode, implement, according to a control instruction that is received by using the user interface apparatus and that is of the chair terminal device, that the sharing terminal device enters the screen sharing mode. In an example, the user interface apparatus is configured to before the sharing apparatus receives, by using the transmission apparatus, the data stream of the screen sharing information from the at least two sharing terminal devices in the conference, receive a first sharing request instruction from the chair terminal device. The first sharing request instruction requests the sharing terminal device to share a screen. The sharing apparatus is further configured to send the first sharing request instruction to the sharing terminal device by using the transmission apparatus, and receive a first sharing response instruction sent by the sharing terminal device. The first sharing response instruction is used to indicate that the sharing terminal device agrees to share the screen. Then, the sharing apparatus may control the sharing terminal device to enter the screen sharing mode, and send the first sharing response instruction to the chair terminal device by using the user interface apparatus.

For another example, the sharing apparatus is further configured to before receiving, by using the transmission apparatus, the data stream of the screen sharing information transmitted by the at least two sharing terminal devices in the screen sharing mode, implement, according to a control instruction that is received by using the user interface apparatus and that is of the sharing terminal device, that the sharing terminal device enters the screen sharing mode. In an example, the user interface apparatus is configured to before the sharing apparatus receives, by using the transmission apparatus, the data stream of the screen sharing information from the at least two sharing terminal devices in the conference, receive a second sharing request instruction from the sharing terminal device. The second sharing request instruction requests to share a screen. The sharing apparatus is further configured to send the second sharing request instruction to the chair terminal device by using the transmission apparatus, and receive a second sharing response instruction sent by the chair terminal device. The second sharing response instruction is used to indicate that the chair terminal device agrees with the sharing terminal device on sharing the screen. Then, the sharing apparatus may control the sharing terminal device to enter the screen sharing mode, and send the second sharing response instruction to the sharing terminal device by using the user interface apparatus. Alternatively, for example, the user interface module is configured to before the sharing module receives, by using the data transmission module, the data stream of the screen sharing information from the at least two sharing terminal devices in the conference, receive a sharing instruction from the sharing terminal device. The sharing instruction instructs the sharing terminal device to start to share the screen. The sharing apparatus is further configured to control the sharing terminal device to enter the screen sharing mode.

In a possible implementation of the fifth aspect, the transmission apparatus is further configured to before receiving the data stream of the screen sharing information transmitted by the at least two sharing terminal devices in the screen sharing mode, establish a data transmission channel with the participating terminal device. For example, the transmission apparatus is configured to establish a network connection to the participating terminal device, obtain a display parameter and a transmission parameter of the participating terminal device, and establish the data transmission channel with the participating terminal device based on the display parameter and the transmission parameter of the participating terminal device.

In a possible implementation of the fifth aspect, the comment apparatus is configured to control, according to a comment instruction that is received by using the user interface apparatus and that is of a first participating terminal device for a target object, the plurality of participating terminal devices to enter a comment mode of the target object. The comment instruction is used to request to comment on the target object, the first participating terminal device is any one of the plurality of participating terminal devices, and the target object includes screen sharing information of at least one sharing terminal device.

For example, the comment apparatus is configured to generate a drawing board according to the comment instruction, obtain an image of the target object that is used to be rendered to the drawing board, and send the comment instruction, the drawing board, and the image of the target object to the plurality of participating terminal devices by using the transmission apparatus, to enable the plurality of participating terminal devices to enter the comment mode of the target object. For another example, the comment apparatus is configured to send the comment instruction to the plurality of participating terminal devices, to enable the plurality of participating terminal devices to generate drawing boards, obtain an image, of the target object, used to be rendered to the drawing board, and render the image of the target object to the drawing board, to enter the comment mode of the target object. For another example, the comment apparatus is configured to obtain, according to the comment instruction, an image, of the target object, used to be rendered to a drawing board. The comment apparatus is further configured to send, by using the transmission apparatus, the obtained image, of the target object, used to be rendered to the drawing board to the plurality of participating terminal devices, to enable the plurality of participating terminal devices to generate the drawing boards. The comment apparatus is further configured to render the image of the target object to the drawing board, to enter the comment mode of the target object.

In a possible implementation of the fifth aspect, the comment apparatus is further configured to receive, by using the user interface apparatus from a second participating terminal device, comment information of the target object, and send, by using the transmission apparatus, the comment information to the plurality of participating terminal devices. The second participating terminal device is any one of the plurality of participating terminal devices. For example, the comment information includes a start location of a comment on the image of the target object, an end location of the comment on the image of the target object, and a type of the comment. Optionally, the comment information further includes at least one of the following: the drawing board, the image of the target object, or an identifier of a user that comments on the image of the target object.

In a possible implementation of the fifth aspect, the data management apparatus is configured to store the comment information in a structured manner.

In a possible implementation of the fifth aspect, the participating terminal device is configured to receive the data stream that is of the screen sharing information of the at least two sharing terminal devices and that is distributed by the sharing apparatus by using the transmission apparatus, and display, based on the data stream of the screen sharing information of the at least two sharing terminal devices, the information shared by the at least two sharing terminal devices.

In a possible implementation of the fifth aspect, the participating terminal device is configured to render the data stream of the screen sharing information of the sharing terminal devices to cards corresponding to the sharing terminal devices, and display, in a user interface of the participating terminal device, the cards corresponding to the sharing terminal devices.

In a possible implementation of the fifth aspect, the participating terminal device is further configured to after displaying, in the user interface of the participating terminal device, the cards corresponding to the sharing terminal devices, adjust display of a first card based on an operation performed by a user on the first card in the user interface of the participating terminal device. In this configuration, the first card is any one of the cards corresponding to the sharing terminal devices. For example, the operation performed by the user on the first card in the user interface of the participating terminal device includes any one of the following: shrinking the first card, enlarging the first card, moving the first card, or closing the first card.

It should be understood that the web conferencing system may be divided into the sharing apparatus, the transmission apparatus, the comment apparatus, the user interface apparatus, and the data management apparatus from a perspective of logical functions. In an implementation, the foregoing apparatuses may be physically separated, or may be deployed together. Alternatively, some apparatuses are physically separated, and some apparatuses are physically deployed together.

For example, the sharing apparatus, the comment apparatus, the user interface apparatus, and the data management apparatus may be implemented by a processor of a server, and the transmission apparatus may be implemented by, for example, a communications interface of the server. In this case, the apparatuses are physically deployed in one device.

For another example, the sharing apparatus, the comment apparatus, the user interface apparatus, and the data management apparatus may be implemented by at least one server, and the transmission apparatus may be an apparatus, for example, a switch or a router, that has a communications function.

For another example, the sharing apparatus, the comment apparatus, the user interface apparatus, the data management apparatus, and the transmission apparatus may all be deployed in a cloud environment. The sharing apparatus is used as an example. The sharing apparatus may be deployed, for example, on at least one server in a cloud data center.

For another example, the sharing apparatus, the comment apparatus, the user interface apparatus, the data management apparatus, and the transmission apparatus may all be deployed in different environments in a distributed manner. The apparatuses may be separately deployed in any two or three of a terminal device and a computing device (located on a user side), an edge environment, and a cloud environment. This is not limited to some embodiments.

For beneficial effects of the web conferencing system according to the fifth aspect and any possible implementation of the fifth aspect, refer to the beneficial effects brought by the first aspect and any possible implementation of the first aspect. Details are not described herein again.

According to a sixth aspect, this application provides a terminal device. The terminal device is a participating terminal device in a web conferencing system, and the participating terminal device includes a receiving module and a display module. Optionally, the participating terminal device may further include a processing module.

The receiving module is configured to receive a data stream that is of screen sharing information of at least two sharing terminal devices in a conference and that is distributed by the web conferencing system. Each of the at least two sharing terminal devices can control screen sharing.

The display module is configured to display, based on the data stream of the screen sharing information of the at least two sharing terminal devices, the information shared by the at least two sharing terminal devices.

In a possible implementation of the sixth aspect, the display module is configured to render the data stream of the screen sharing information of the sharing terminal devices to cards corresponding to the sharing terminal devices, and display, in a user interface of the participating terminal device, the cards corresponding to the sharing terminal devices.

In a possible implementation of the sixth aspect, the participating terminal device further includes the processing module. The processing module is configured to after the display module displays the cards corresponding to the sharing terminal devices in the user interface of the participating terminal device, adjust display of a first card based on an operation performed by a user on the first card in the user interface of the participating terminal device. In this implementation, the first card is any one of the cards corresponding to the sharing terminal devices.

In a possible implementation of the sixth aspect, the operation performed by the user on the first card in the user interface of the participating terminal device includes any one of the following: shrinking the first card, enlarging the first card, moving the first card, or closing the first card.

For beneficial effects of the terminal device according to the sixth aspect and any possible implementation of the sixth aspect, refer to the beneficial effects brought by the second aspect and any possible implementation of the second aspect. Details are not described herein again.

According to a seventh aspect, this application provides a web conferencing system. The system includes a sharing apparatus, a user interface apparatus, a comment apparatus, and a transmission apparatus. Optionally, the foregoing system may further include a data management apparatus.

The comment apparatus is configured to, when the sharing apparatus distributes a data stream of screen sharing information of at least one sharing terminal device to a plurality of participating terminal devices in a conference by using the transmission apparatus, control, according to a comment instruction that is received by using the user interface apparatus and that is of a first participating terminal device for a target object, the plurality of participating terminal devices to enter a comment mode of the target object, thereby enabling the plurality of participating terminal devices to render an image of the target object on a drawing board. The comment instruction is used to request to comment on the target object, the first participating terminal device is any one of the plurality of participating terminal devices, and the target object includes the screen sharing information of the at least one sharing terminal device.

For example, the comment apparatus is configured to generate the drawing board according to the comment instruction, obtain the image, of the target object, used to be rendered to the drawing board, and send, by using the transmission apparatus, the comment instruction, the drawing board, and the image of the target object to the plurality of participating terminal devices, to enable the plurality of participating terminal devices to enter the comment mode of the target object. For another example, the comment apparatus is configured to send the comment instruction to the plurality of participating terminal devices, to enable the plurality of participating terminal devices to generate drawing boards, obtain the image, of the target object, used to be rendered to the drawing board, and render the image of the target object to the drawing board, to enter the comment mode of the target object. For another example, the comment apparatus is configured to obtain, according to the comment instruction, the image, of the target object, used to be rendered to the drawing board, send, by using the transmission apparatus, the obtained image, of the target object that is used to be rendered to the drawing board to the plurality of participating terminal devices, to enable the plurality of participating terminal devices to generate the drawing boards, and render the image of the target object to the drawing board, to enter the comment mode of the target object.

In a possible implementation of the seventh aspect, the comment apparatus is further configured to receive, by using the user interface apparatus from a second participating terminal device, comment information of the target object, and send the comment information to the plurality of participating terminal devices by using the transmission apparatus. The second participating terminal device is any one of the plurality of participating terminal devices. For example, the comment information includes a start location of a comment on the image of the target object, an end location of the comment on the image of the target object, and a type of the comment. Optionally, the comment information further includes at least one of the following: the drawing board, the image of the target object, or an identifier of a user that comments on the image of the target object.

In a possible implementation of the seventh aspect, the data management apparatus is configured to store the comment information in a structured manner.

For description of the apparatuses in the seventh aspect, refer to the description of the apparatuses in the fifth aspect. Details are not described herein again.

For beneficial effects of the web conferencing system according to the seventh aspect and any possible implementation of the seventh aspect, refer to the beneficial effects brought by the third aspect and any possible implementation of the third aspect. Details are not described herein again.

According to an eighth aspect, this application provides a web conferencing system. The system includes a user interface apparatus, a comment apparatus, and a data management apparatus.

The comment apparatus is configured to control, according to a comment instruction that is received by using the user interface apparatus and that is of a first participating terminal device for a target object, the plurality of participating terminal devices to enter a comment mode of the target object. The comment instruction is used to request to comment on the target object, the first participating terminal device is any one of the plurality of participating terminal devices, and the target object includes screen sharing information of at least one sharing terminal device or a whiteboard in the web conferencing system. The comment apparatus is further configured to receive, by using the user interface apparatus from a second participating terminal device, comment information of the target object. The second participating terminal device herein is any one of the plurality of participating terminal devices. The data management apparatus is configured to store the comment information in a structured manner.

For description of the apparatuses in the eighth aspect, refer to the description of the apparatuses in the fifth aspect. Details are not described herein again.

For beneficial effects of the web conferencing system according to the eighth aspect, refer to the beneficial effects brought by the fourth aspect. Details are not described herein again.

According to a ninth aspect, this application provides a computing device. The computing device includes a memory and a processor, and the memory is configured to store a group of computer instructions. The processor executes the group of computer instructions stored in the memory, to enable the computing device to perform the method according to any one of the first aspect or the possible implementations of the first aspect, perform the method according to any one of the third aspect or the possible implementations of the third aspect, or perform the method according to any one of the fourth aspect or the possible implementations of the fourth aspect.

According to a tenth aspect, this application provides a terminal device. The terminal device includes a memory and a processor, and the memory is configured to store a group of computer instructions. The processor executes the group of computer instructions stored in the memory, to enable the terminal device to perform the method according to any one of the second aspect or the possible implementations of the second aspect.

According to an eleventh aspect, this application provides a web conferencing system. The web conferencing system includes at least one server and a plurality of participating terminal devices. The server is configured to perform the method according to the first aspect or the possible implementations of the first aspect, and the participating terminal device is configured to perform the method according to the second aspect or the possible implementations of the second aspect.

According to a twelfth aspect, this application provides a web conferencing system. The web conferencing system includes at least one server and a plurality of participating terminal devices. The server is configured to perform the method according to the third aspect or the possible implementations of the third aspect.

According to a thirteenth aspect, this application provides a web conferencing system. The web conferencing system includes at least one server and a plurality of participating terminal devices. The server is configured to perform the method according to the fourth aspect.

According to a fourteenth aspect, an embodiment of this application provides an information processing apparatus. The information processing apparatus stores a computer program, and when the computer program is executed by the information processing apparatus, the method according to the first aspect or the possible implementations of the first aspect, the method according to the second aspect or the possible implementations of the second aspect, the method according to the third aspect or the possible implementations of the third aspect, or the method according to the fourth aspect is implemented. The information processing apparatus may be, for example, a chip.

According to a fifteenth aspect, an embodiment of this application provides an information processing apparatus. The information processing apparatus includes a processor and an interface circuit. The interface circuit is configured to receive computer-executable instructions and transmit the computer-executable instructions to the processor. The processor runs the computer-executable instructions to perform the method according to the first aspect or the possible implementations of the first aspect, the method according to the second aspect or the possible implementations of the second aspect, the method according to the third aspect or the possible implementations of the third aspect, or the method according to the fourth aspect. The information processing apparatus may be, for example, a chip.

According to a sixteenth aspect, an embodiment of this application provides an information processing apparatus. The information processing apparatus includes a processor and a memory. The memory is configured to store computer-executable instructions. The processor is configured to execute the computer-executable instructions stored in the memory, to enable the information processing apparatus to perform the method according to the first aspect or the possible implementations of the first aspect, the method according to the second aspect or the possible implementations of the second aspect, the method according to the third aspect or the possible implementations of the third aspect, or the method according to the fourth aspect. The information processing apparatus may be, for example, a chip.

According to a seventeenth aspect, an embodiment of this application provides an information processing apparatus. The information processing apparatus includes a processor, a memory, and a transceiver. The transceiver is configured to receive a signal or send a signal. The memory is configured to store a computer program. The processor is configured to invoke the computer program from the memory to perform the method according to the first aspect or the possible implementations of the first aspect, the method according to the second aspect or the possible implementations of the second aspect, the method according to the third aspect or the possible implementations of the third aspect, or the method according to the fourth aspect. The information processing apparatus may be, for example, a chip.

According to an eighteenth aspect, this application provides a non-transitory computer-readable storage medium. The non-transitory computer-readable storage medium stores computer program code, and when the computer program code is executed by a computing device, the computing device performs the method according to the first aspect or the possible implementations of the first aspect, the method according to the third aspect or the possible implementations of the third aspect, or the method according to the fourth aspect. The storage medium includes but is not limited to a volatile memory, for example, a random access memory or a non-volatile memory, for example, a flash memory, a hard disk drive (HDD), or a solid-state drive (SSD).

According to a nineteenth aspect, this application provides a non-transitory computer-readable storage medium. The non-transitory computer-readable storage medium stores computer program code. When the computer program code is executed by a computing device, the computing device performs the method according to any one of the second aspect or the possible implementations of the second aspect. The storage medium includes but is not limited to a volatile memory, for example, a random access memory or a non-volatile memory, for example, a flash memory, a HDD, or a SSD.

According to a twentieth aspect, this application provides a computer program product. The computer program product includes computer program code, and when the computer program code is executed by a computing device, the computing device performs the method according to the first aspect or the possible implementations of the first aspect, the method according to the third aspect or the possible implementations of the third aspect, or the method according to the fourth aspect. The computer program product may be a software installation package. When the method according to any one of the first aspect or the possible implementations of the first aspect needs to be used, the computer program product may be downloaded to and executed on the computing device.

According to a twenty-first aspect, this application provides a computer program product. The computer program product includes computer program code, and when the computer program code is executed by a computing device, the computing device performs the method according to any one of the second aspect or the possible implementations of the second aspect. The computer program product may be a software installation package. When the method according to any one of the second aspect or the possible implementations of the second aspect needs to be used, the computer program product may be downloaded to and executed on the computing device.

According to the information processing method, the device, the system, the storage medium, and the computer program product provided in the embodiments of this application, when a plurality of users join a web conference by using the web conferencing system, the plurality of users may simultaneously share screens by using the web conferencing system, without waiting for another user in the conference to complete screen sharing. In other words, the web conferencing system can implement information sharing between a plurality of users and a plurality of terminal devices, so that information is conveniently shared between the plurality of users at the same time, and communication efficiency between the users is improved.

DESCRIPTION OF EMBODIMENTS

Figure 1:
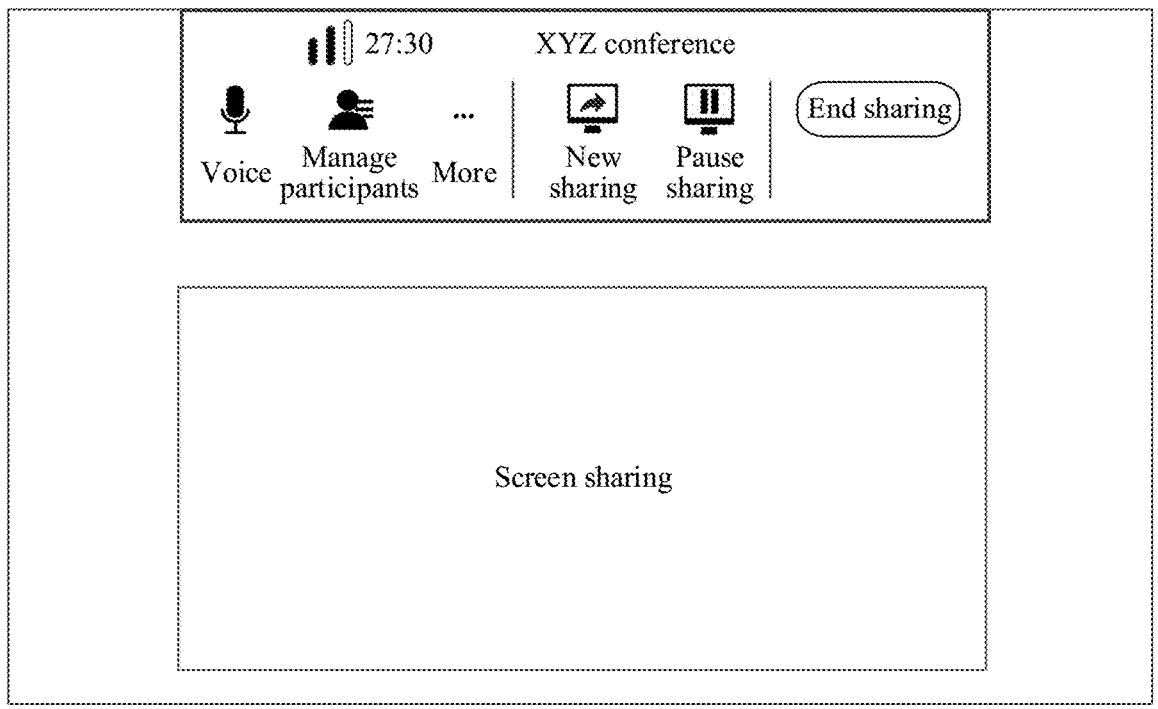
FIG. 1 is a schematic diagram 1 of a screen sharing interface of a web conferencing system in a conventional technology.
Figure 2:
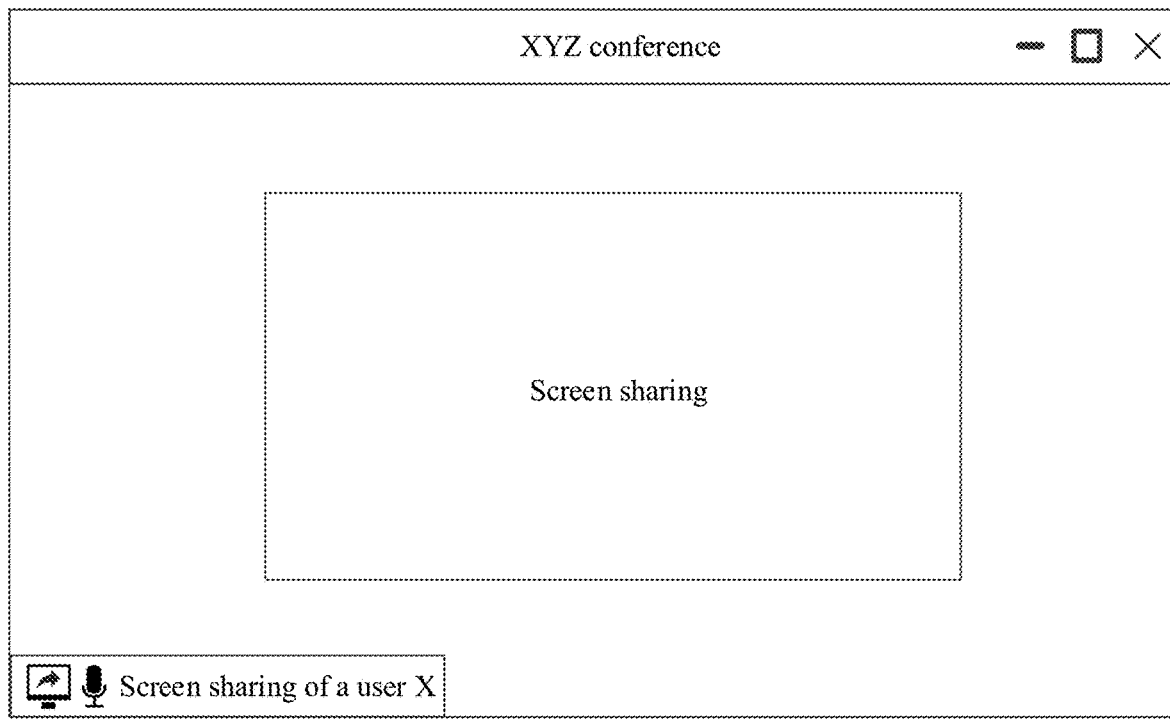
FIG. 2 is a schematic diagram 2 of a screen sharing interface of a web conferencing system in the conventional technology.

FIG. 1 is a schematic diagram 1 of a screen sharing interface of a web conferencing system in the conventional technology. FIG. 2 is a schematic diagram 2 of a screen sharing interface of a web conferencing system in the conventional technology. FIG. 1 and FIG. 2 show an example in which a user X in a web conferencing system of an application (APP) version shares a screen. Currently, a web conferencing system of an APP version in the conventional technology supports a single-person screen sharing function. In other words, when the user X shares the screen, another participant can only view the screen shared by the user X. FIG. 1 is a schematic diagram of a user interface viewed by the user X who shares the screen, and FIG. 2 is a schematic diagram of an interface diagram viewed by the another user when the user X shares the screen.

In this scenario, if another user also needs to share a screen of another user, another user can share the screen only after the user X ends sharing. As a result, communication efficiency between users is relatively low. In view of this problem, an embodiment of this application provides an information processing method, to share information between a plurality of users and a plurality of terminal devices. In other words, a plurality of users may simultaneously share information on their own screens (multi-screen sharing for short). This facilitates simultaneous sharing of the information between the pluralities of users.

It should be understood that a terminal device in embodiments of this application may be referred to as a terminal, user equipment (UE), a mobile station (MS), a mobile terminal (MT), or the like. The terminal device may be a mobile phone (e.g., smart phone), a tablet computer (e.g., pad), a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

A web conferencing system in the embodiments of this application may be a web conferencing system of any type, for example, a web conferencing system of an APP version or a web conferencing system of a web version. It may be understood that, if the web conferencing system is the web conferencing system of the web version, a user may log in to the web conferencing system by using a web browser on a terminal device, without additionally installing an APP or additionally configuring hardware used for a web conference. In other words, the user may operate a user interface of the web conferencing system by using the web browser. In these implementations, all addition, deletion, modification, and query operations of the web conferencing system of the web version may use a representational state transfer (REST) application programming interface (API) based on a hypertext transfer protocol (HTTP) for communication.

Certainly, the method in the embodiments of this application may also be applied to another scenario of "there are a plurality of users and a plurality of terminal devices, and screen sharing is required". This is not limited.

Figure 3:
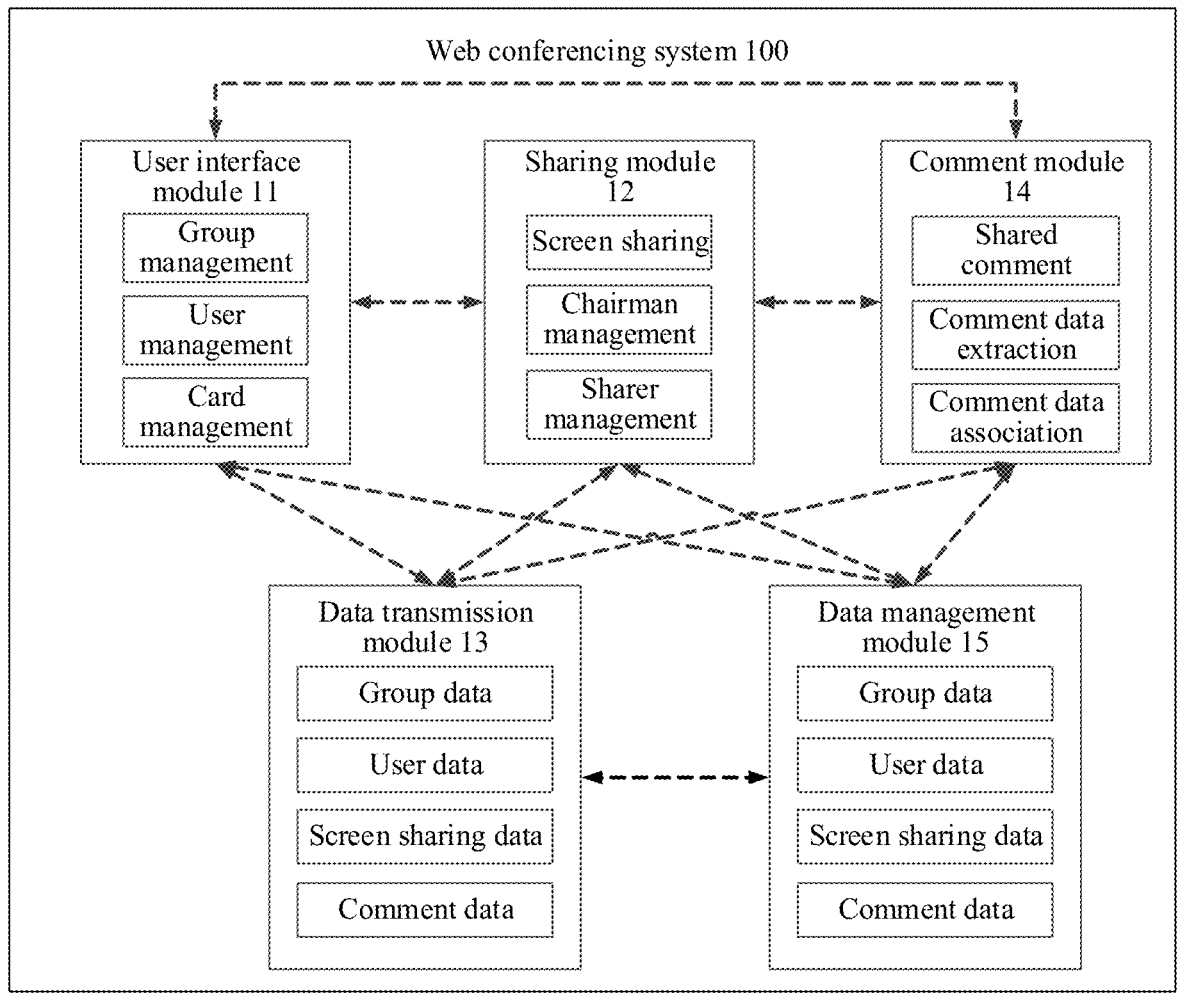
FIG. 3 is a schematic diagram of a structure of a web conferencing system 100 according to an embodiment of this application.

FIG. 3 is a schematic diagram of a structure of a web conferencing system 100 according to an embodiment of this application. As shown in FIG. 3, the web conferencing system 100 may include a sharing module 12 (e.g., a sharing circuit) and a data transmission module 13 (e.g., a data transmission circuit). Optionally, the web conferencing system 100 may further include a user interface module 11 (e.g., a user interface circuit), a comment module 14 (e.g., a comment circuit), and/or a data management module 15 (e.g., a data management circuit).

Functions of the modules in the web conferencing system 100 are briefly described below.

The user interface module 11 provides functions such as group management, user management, and card management, and entries of other functions (for example, an entry of a screen sharing function and an entry of a comment function). In other words, a user may, by using the user interface module 11, initiate screen sharing, accept a screen shared by a sharing terminal device in a conference, or initiate commenting or end commenting. In an example of the user interface module 11, a graphical user interface (GUI) may be used for implementation. For example, the web conferencing system of the web version is used as an example. The user interface module 11 may be compiled by using, for example, an open-source front-end framework (e.g., Vue framework). The Vue framework is a progressive framework for building a user interface. The Vue framework focuses on implementing a view layer to interact with a user and receive a user instruction. The user interface module 11 (or the user interface) compiled by using the Vue framework may provide, in a form of a card, entries of the group management, the user management, and another function.

The sharing module 12 provides functions such as screen sharing, chairman management, and sharer management. The sharing module 12 may push shared information to all participating terminal devices. Optionally, the sharing module 12 allows a chairman of a conference to invite a single user or a plurality of users to share information, or allows a user to actively initiate sharing, or the like. For example, the web conferencing system of the web version is used as an example. The sharing module 12 may be developed by using, for example, an open-source component web real-time communication (WebRTC), to transmit information through streaming media such as video, to implement information sharing between the pluralities of users. It should be understood that the WebRTC is a component that supports a web browser to implement streaming media transmission such as real-time voice conversations and video conversations, may provide functions such as audio and video collection, encoding and decoding, network transmission, and display across platforms such as Windows, Linux, Mac, and Android.

The data transmission module 13 provides a real-time data transmission service, and is configured to distribute screen sharing information, comment information, participant information, and group information to terminal devices of all participants in real time, to achieve a multi-person multi-screen real-time interaction effect. For example, the web conferencing system of the web version is used as an example. The data transmission module 13 may be developed by using a Netty real-time communications component, and is connected to the user by using a socket, so that shared information may be transmitted in real time between participants. An asynchronous and event-driven network application framework provided by Netty enables lowlatency information transmission in a multi-user and high-concurrency scenario. This can ensure real-time data transmission performance.

The comment module 14 provides a real-time online comment function. All participants can comment on shared information at any time, and the comment information is distributed to all the participants in real time. For example, the web conferencing system of the web version is used as an example. The comment module 14 may be developed by using an open-source component, such as FabricJS, to complete various writing, drawing, and comment operations based on a canvas. For example, shared information may be added to the canvas as a picture object, and commenting is performed based on the shared information.

The data management module 15 provides data services, for example, storage, processing, archiving, association, and query, of information such as conference information, participant information, and comment information. For example, the data management module 15 may be implemented based on a MongoDB database. MongoDB is a non-relational database that loosely stores objects such as images, strokes, and texts. In addition, MongoDB has powerful data query capabilities, supports object-oriented query languages, and provides powerful support for storing the comment information in a structured manner.

With the functions of the foregoing modules, the web conferencing system 100 provided in some embodiments may provide a web conferencing service for the user, to implement the information sharing between a plurality of users and a plurality of terminal devices.

It should be understood that FIG. 3 is merely an example of the schematic diagram of a structure of the web conferencing system 100, and division into the modules in the web conferencing system 100 is not limited in this application. To be specific, the division into the modules in the web conferencing system 100 shown in FIG. 3 is merely an example. This application sets no limitation on whether the web conferencing system 100 is divided into the modules, how to divide the modules, naming of the modules, and an implementation of the modules.

Figure 4:
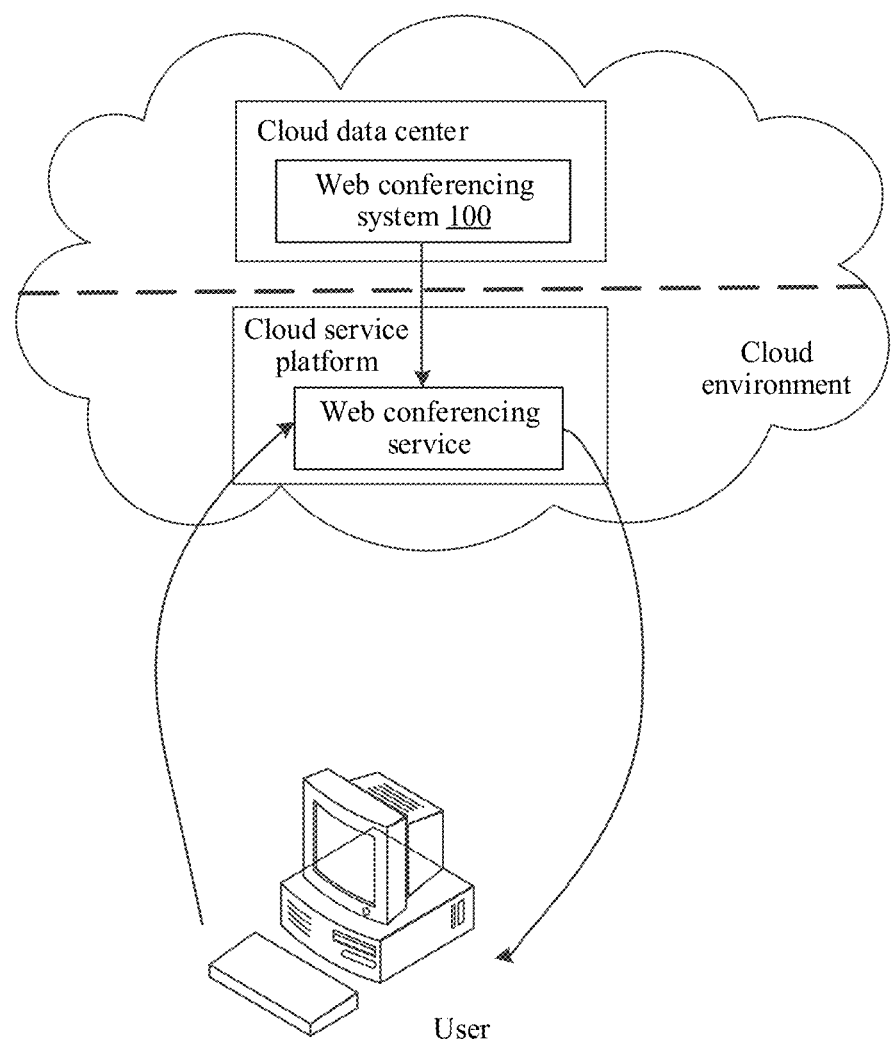
FIG. 4 is a schematic diagram of an application scenario of a web conferencing system 100 according to an embodiment of this application.

FIG. 4 is a schematic diagram of an application scenario of the web conferencing system 100 according to an embodiment of this application. As shown in FIG. 4, in an embodiment, the web conferencing system 100 may be all deployed in a cloud environment. The cloud environment is an entity that uses a basic resource to provide a cloud service for a user in a cloud computing mode. The cloud environment includes a cloud data center and a cloud service platform. The cloud data center includes a large quantity of basic resources (including compute resources, storage resources, and network resources) owned by a cloud service provider. The compute resources included in the cloud data center may be a large quantity of computing devices (for example, servers). For example, a computing resource included in the cloud data center is a server running a virtual machine. The web conferencing system 100 may be independently deployed on a server or a virtual machine in the cloud data center. Alternatively, the web conferencing system 100 may be deployed on a plurality of servers in the cloud data center in a distributed manner, deployed on a plurality of virtual machines in the cloud data center in a distributed manner, or deployed on a server and a virtual machine in the cloud data center in a distributed manner.

As shown in FIG. 4, the web conferencing system 100 may, for example, be abstracted by the cloud service provider into a web conferencing service on the cloud service platform and provided to a user. After the user purchases the cloud service on the cloud service platform (for example, pre-charging can be performed, and settlement is made based on final resource usage), the cloud environment provides the web conferencing service for the user by using the web conferencing system 100 deployed on the cloud data center.

Figure 5:
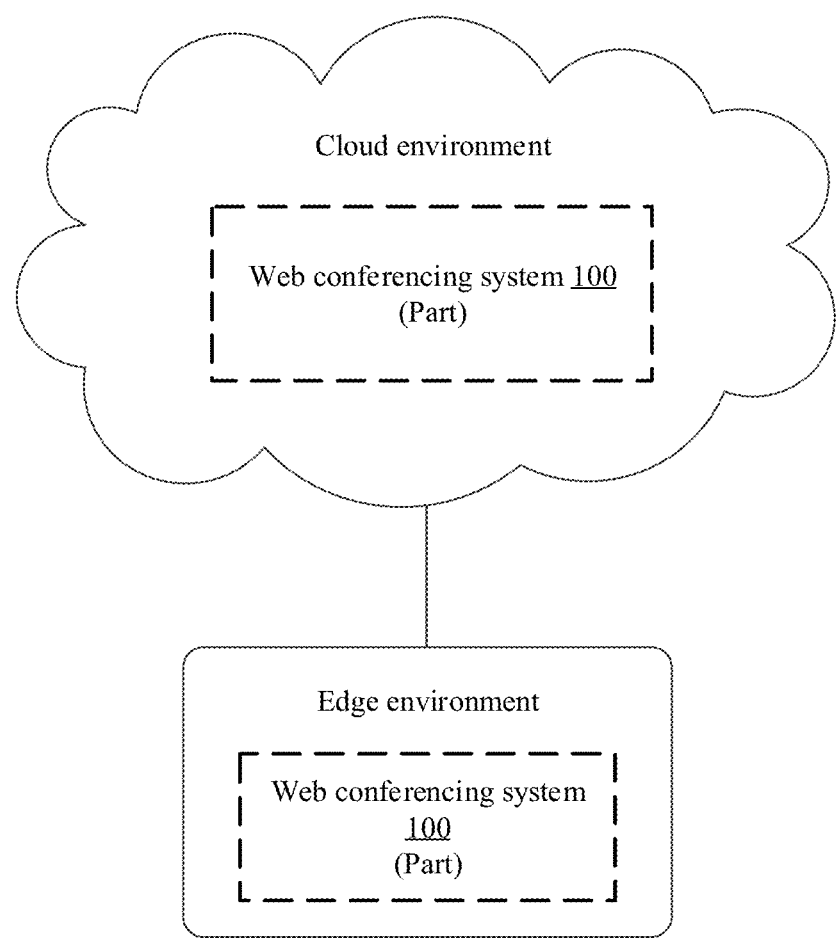
FIG. 5 is a schematic diagram of another application scenario of a web conferencing system 100 according to an embodiment of this application.

Deployment of the web conferencing system 100 provided in some embodiments of the application is flexible. FIG. 5 is a schematic diagram of another application scenario of the web conferencing system 100 according to an embodiment of this application. As shown in FIG. 5, in another embodiment, the web conferencing system 100 provided in some embodiments of the application may alternatively be deployed in different environments in a distributed manner. For example, the web conferencing system 100 provided in this application may be logically divided into a plurality of parts, and each part has a different function. Each part in the web conferencing system 100 may be separately deployed on any two or three of a terminal device and a computing device (located on a user side), an edge environment, and a cloud environment. The terminal device and the computing device that are located on the user side may include, for example, at least one of the following: a terminal device server, a smartphone, a notebook computer, a tablet computer, a personal desktop computer, or a smart camera. The edge environment is an environment that includes a set of edge computing devices that are close to the terminal device and the computing device, and the edge computing device includes: an edge server, an edge station with computing power, and the like. All parts of the web conferencing system 100 deployed in different environments or devices collaborate to implement a function of providing a web conference for a user. It should be understood that, in some embodiments, a specific environment in which some parts of the web conferencing system 100 are deployed is not limited. In actual application, adaptive deployment may be performed based on a computing capability of the terminal device and the computing device, resource usage of the edge environment and the cloud environment, or a specific application requirement. FIG. 5 is a schematic diagram of an application scenario on which the web conferencing system 100 is separately deployed in the edge environment and the cloud environment.

Figure 6:
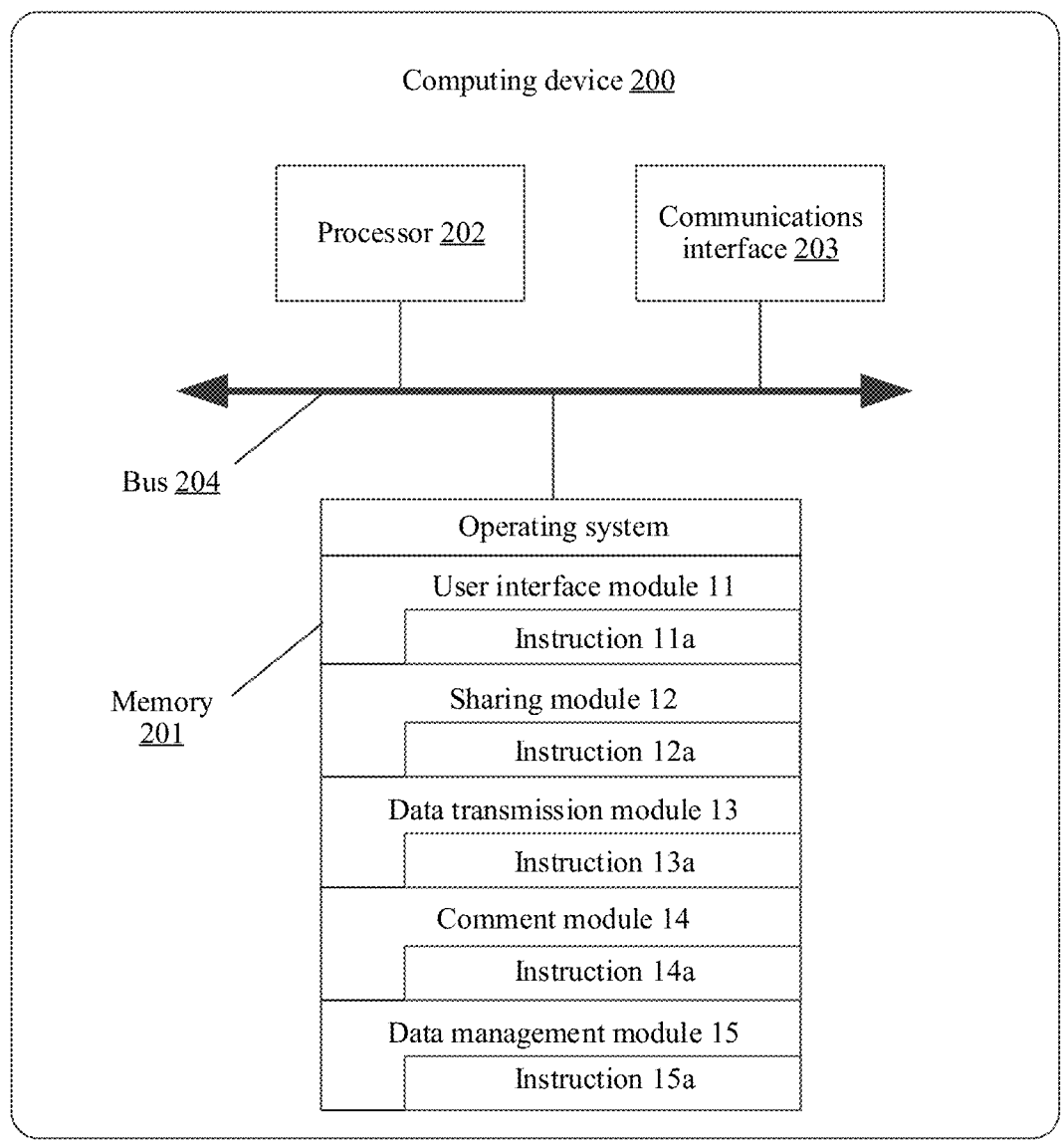
FIG. 6 is a schematic diagram of a hardware structure of a computing device 200 in which a web conferencing system 100 is deployed.

The web conferencing system 100 may also be independently deployed on a computing device in any environment (for example, independently deployed on an edge server in the edge environment). FIG. 6 is a schematic diagram of a hardware structure of a computing device 200 in which the web conferencing system 100 is deployed. The computing device 200 shown in FIG. 6 includes a memory 201, a processor 202, and a communications interface 203. The memory 201, the processor 202, and the communications interface 203 are communicatively connected to each other. For example, the memory 201, the processor 202, and the communications interface 203 may be communicatively connected to each other through a network connection. Alternatively, the computing device 200 may further include a bus 204. The memory 201, the processor 202, and the communications interface 203 are communicatively connected to each other through the bus 204. FIG. 6 shows the computing device 200 in which the memory 201, the processor 202, and the communications interface 203 are communicatively connected to each other through the bus 204.

The memory 201 may be a read-only memory (ROM), a static storage device, a dynamic storage device, or a random access memory (RAM). The memory 201 may store a program. For example, the program may be a program corresponding to an operating system, so that the processor 202 may run the operating system by using the program in the memory 201. The operating system may be any one or more computer operating systems that implement service processing through a process, for example, a Linux operating system, a UNIX operating system, an Android operating system, an iOS operating system, or a Windows operating system.

The operating system may include the modules in the network system shown in FIG. 3. Each module may include corresponding instructions, for example, the user interface module 11 may include an instruction 11a. When the instruction 11a is executed by the processor 202, the processor 202 and the communications interface 203 may perform a function of the user interface module 11. This is similar for other modules, and details are not described herein. In other words, when the instructions, stored in the memory 201, of each module in the web conferencing system 100 are executed by the processor 202, the processor 202 and the communications interface 203 are configured to perform a function of the web conferencing system 100. The memory may further store data that needs to be stored in the web conferencing system 100, for example, store information such as conference information, participant information, and comment information.

The processor 202 may be a general-purpose central processing unit (CPU), a microprocessor, an application-specific integrated circuit (ASIC), a graphics processing unit (GPU), or one or more integrated circuits.

The processor 202 may be an integrated circuit chip and has a signal processing capability. In an implementation process, a function of the web conferencing system 100 in this application may be completed by using an integrated logic circuit of hardware in the processor 202 or instructions in a form of software. The processor 202 may alternatively be a general-purpose processor, a digital signal processor (DSP), an application-specific integrated circuit (ASIC), a field programmable gate array (FPGA), or another programmable logic device, a discrete gate or transistor logic device, or a discrete hardware component, and may implement or perform the methods, the steps, and the logical block diagrams that are disclosed in the following embodiments of this application. The general-purpose processor may be a microprocessor, or the processor may be any conventional processor, or the like. Steps of the methods disclosed with reference to the following embodiments of this application may be directly executed and completed by using a hardware decoding processor, or may be executed and completed by using a combination of hardware and software modules in the decoding processor. A software module may be located in a mature storage medium in the art, such as a RAM, a flash memory, a ROM, a programmable read-only memory (PROM), an electrically erasable programmable memory (EEPROM), or a register. The storage medium is located in the memory 201. The processor 202 reads information in the memory 201, and completes a function of the web conferencing system 100 in some embodiments in combination with hardware of the processor 202.

The communications interface 203 may be, but is not limited to, a transceiver module, for example, a transceiver, to implement communication between the computing device 200 and another device or a communications network. For example, a dataset may be obtained through the communications interface 203.

When the computing device 200 includes the bus 204, the bus 204 may include a channel used to transfer information between components (for example, the memory 201, the processor 202, and the communications interface 203) of the computing device 200.

The following describes in detail the technical solutions in the embodiments of this application with reference to embodiments by using the web conferencing system 100 as an example. The following several embodiments may be combined with each other, and a same or similar concept or process may not be described repeatedly in some embodiments.

Figure 7:
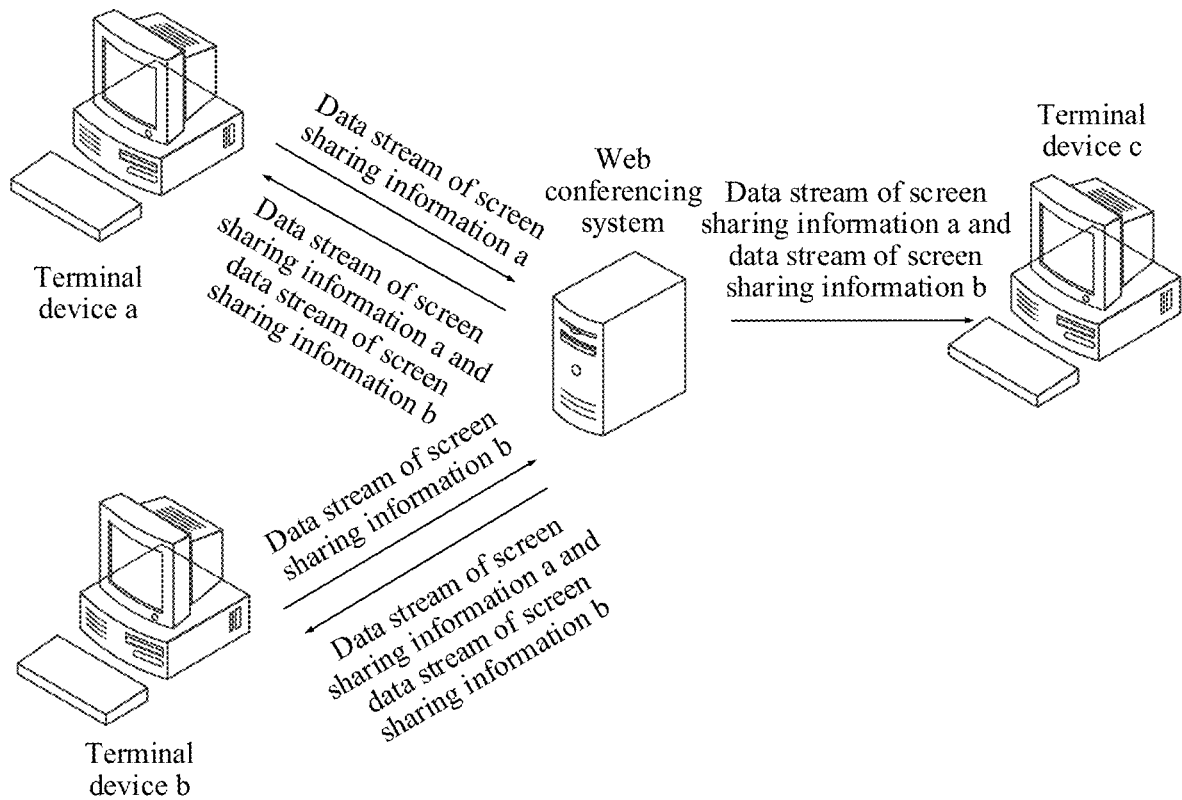
FIG. 7 is a schematic diagram of an information processing method according to an embodiment of this application.

FIG. 7 is a schematic diagram of an information processing method according to an embodiment of this application. In some embodiments, a terminal device a, a terminal device b, and a terminal device c that are in a same conference are used as an example to describe how to implement screen sharing between a plurality of users and a plurality of terminal devices. Both the terminal device a and the terminal device b are terminal devices (sharing terminal devices for short) that share screens in the conference. The terminal device c is a terminal device that does not share a screen in the conference. The terminal device a, the terminal device b, and the terminal device c are all participating terminal devices in the conference.

As shown in FIG. 7, the method may include the following steps.

S101: Receive a data stream of screen sharing information from at least two sharing terminal devices in the conference.

The terminal device a is used as an example. Screen sharing information a shared by the terminal device a may be a desktop of the terminal device a, an application currently started on the terminal device a, a document (for example, an office document or a portable document format (PDF) document) currently opened on the terminal device a, or the like. Correspondingly, screen sharing information b shared by the terminal device b may be a desktop of the terminal device b, an application currently started on the terminal device b, a document (for example, an office document or a PDF document) currently opened on the terminal device b, or the like.

It should be understood that the terminal device a and the terminal device b may share information of different types. For example, the terminal device a shares a document, and the terminal device b shares an application. This is merely an example for description: A plurality of terminal devices in the conference may simultaneously share screens, and may share different content.

S102: Distribute the data stream of the screen sharing information of the at least two sharing terminal devices to all participating terminal devices in the conference.

After receiving the screen sharing information of the sharing terminal devices, a web conferencing system may distribute the screen sharing information to all participating terminal devices. Correspondingly, after receiving the screen sharing information of the sharing terminal devices, the participating terminal device may display, based on the data stream of the screen sharing information of the at least two sharing terminal devices, the information shared by the at least two sharing terminal devices for a user to view. In this manner, information sharing between a plurality of users and a plurality of terminal devices may be implemented. To be specific, the plurality of users may simultaneously share information on their own screens, so that the information is conveniently shared between the pluralities of users at the same time. This improves communication efficiency between the users in the conference.

The terminal device a, the terminal device b, and the terminal device e are used as an example. In this example, after receiving the screen sharing information a shared by the terminal device a and the screen sharing information b shared by the terminal device b, the web conferencing system may distribute the screen sharing information a and the screen sharing information b to the terminal device a, the terminal device b, and the terminal device c. In this way, all participating terminal devices in the conference may display the screen sharing information a shared by the terminal device a and the screen sharing information b shared by the terminal device b.

Figure 8:
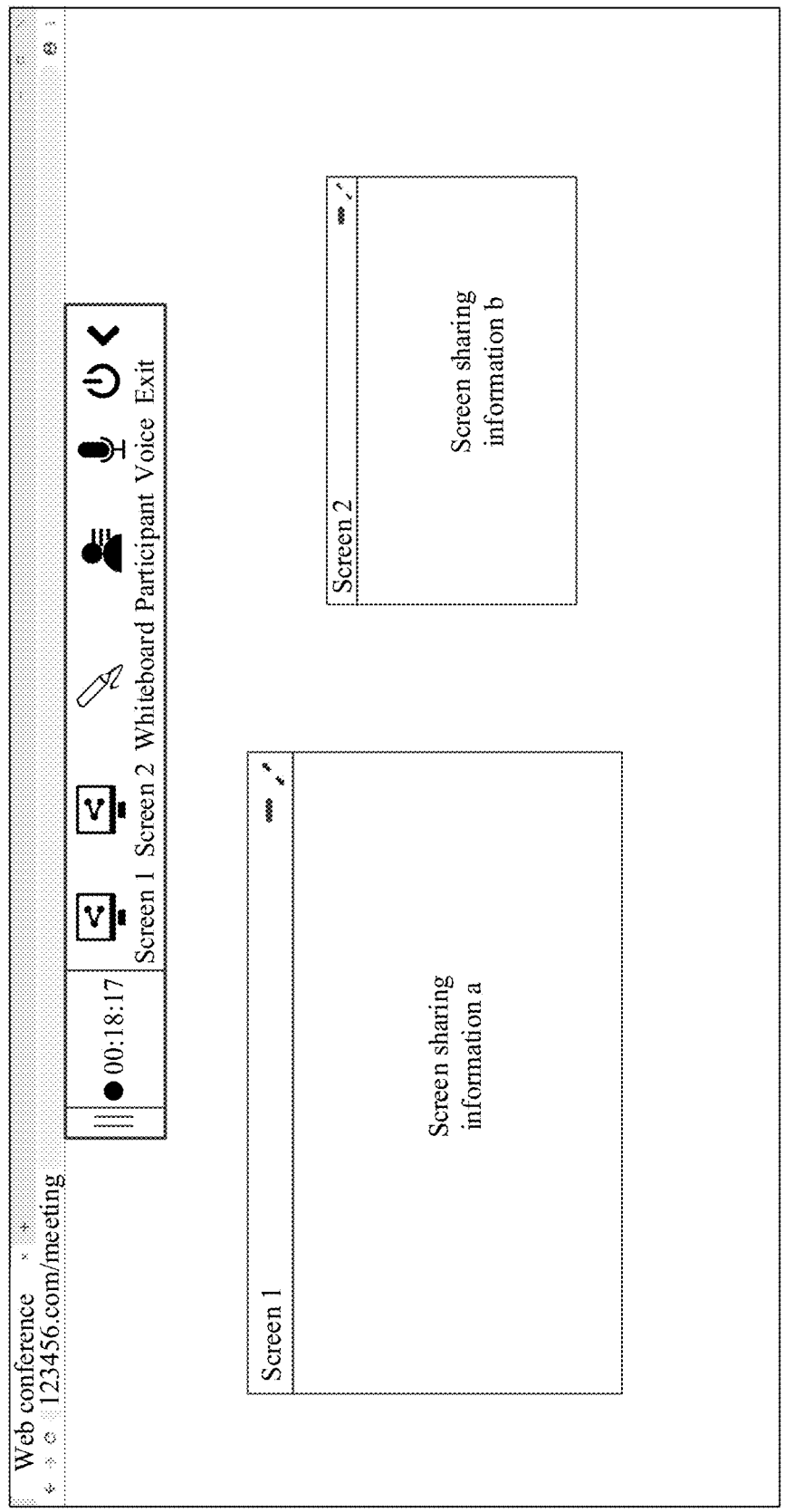
FIG. 8 is a schematic diagram 1 of a user interface according to an embodiment of this application.

An example in which a screen shared by each sharing terminal device is displayed by using a card is used. To be specific, different screen sharing information is rendered on different cards for display. FIG. 8 is a schematic diagram 1 of a user interface according to an embodiment of this application. As shown in FIG. 8, the terminal device a, the terminal device b, and the terminal device c are used as an example. When the method in some embodiments of the application are used, all participating terminal devices in the conference may display, by using one card, the screen sharing information a (namely, a screen 1) shared by the terminal device a, and display, by using another card, the screen sharing information b (namely, a screen 2) shared by the terminal device b. Therefore, all participants in a conference views, by using a user interface of his or her terminal device, the screen sharing information a (namely, the screen 1) shared by the terminal device a and the screen sharing information b (namely, the screen 2) shared by the terminal device b at the same time. This improves communication efficiency between users in the conference.

Optionally, locations of the screen 1 and the screen 2 in the user interface may be adjusted based on a requirement of a user. For example, the screen 1 may be located on the left side of the screen 2, located on the right side of the screen 2, located above the screen 2, or located below the screen 2. For another example, the screen 1 and the screen 2 may be at least partially overlaid. An example in which the screen 1 is overlaid on the screen 2 is used. In this case, at least a part of content of the screen 2 may be blocked by the screen 1, which is specifically related to a size of an area obtained by overlaying the screen 1 on the screen 2. For another example, the user may turn off the screen 1 and retain only the screen 2, or the user may turn off the screen 2 and retain only the screen 1. Although the terminal device of the user receives data of the screen 1 and the screen 2, the user interface of the terminal device displays only either of the screens.

Optionally, sizes of the screen 1 and the screen 2 in the user interface may be adjusted based on a requirement of the user. For example, the screen 1 is located on the left side of the screen 2. In this way, sizes of the screen 1 and the screen 2 may be the same, the screen 1 is large and the screen 2 is small, or the screen 1 is small and the screen 2 is large.

Figure 9A:
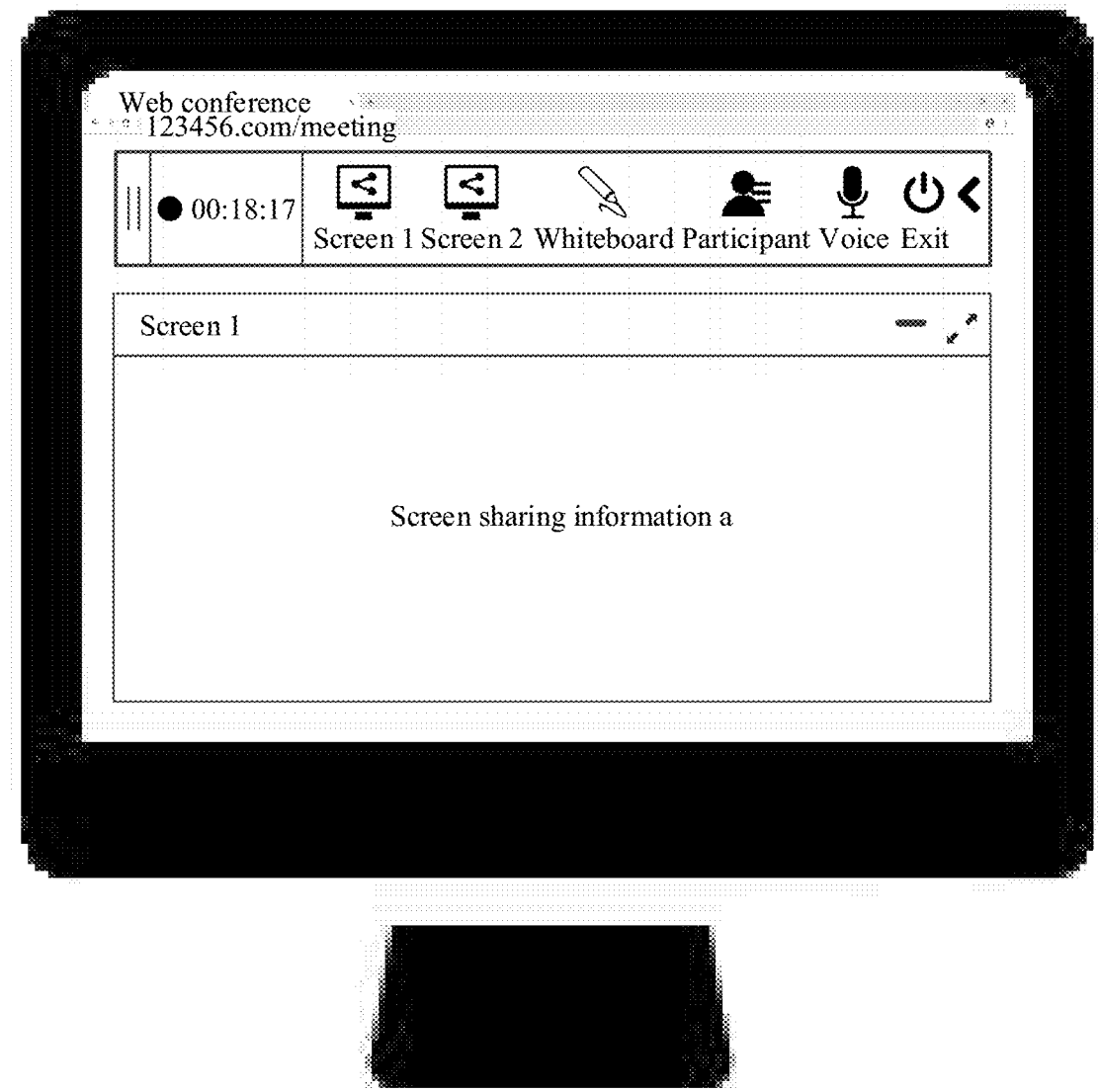
FIG. 9A and FIG. 9B are a schematic diagram 2 of a user interface according to an embodiment of this application.
Figure 9B:

FIG. 9A and FIG. 9B are a schematic diagram 2 of a user interface according to an embodiment of this application. As shown in FIG. 9A and FIG. 9B, optionally, when a terminal device of a participant has a plurality of screens (for example, a participating terminal device has a first screen and a second screen), the screen 1 and the screen 2 may be displayed on a same screen, or may be displayed on different screens in a card separation manner. For example, when the screen 1 and the screen 2 are displayed on the same screen, the user interface is shown in FIG. 8. For example, when the screen 1 and the screen 2 are displayed on different screens, the user interface is shown in FIG. 9A and FIG. 9B, and may be specifically set based on an actual requirement of the user.

In other words, according to the information processing method provided in the embodiment, after cards corresponding to the sharing terminal devices are displayed in the user interface of the participating terminal device, display of a first card may be adjusted based on an operation (for example, shrinking the first card, enlarging the first card, moving the first card, or closing the first card) performed by the user on the first card in the user interface of the participating terminal device. The first card herein may be, for example, any card in the cards corresponding to the sharing terminal devices. In other words, the users may adjust, in the user interface based on requirements of the users, a display effect of a screen shared by a plurality of terminals. This improves user experience. In these implementations, the users may adjust, by using the user interface module 11 of the web conferencing system, the display effect of the screen shared by the plurality of terminals. This improves user experience.

It should be understood that although some embodiments of the application are described by using an example in which two terminal devices simultaneously share screens, the method in some embodiments may also be applied to a scenario in which more than two terminal devices simultaneously share screens. In other words, a quantity of shared screens displayed in the user interface of the terminal device of the participant in the conference may be determined based on a quantity of sharing terminal devices in the conference.

The following describes a manner of triggering the sharing terminal device to enter a screen sharing mode. The terminal device a is used as an example. For example, the terminal device a may be triggered to share a screen in the following two manners.

Manner 1: The sharing terminal device can enter the screen sharing mode according to a control instruction of a chair terminal device. To be specific, a chairman of the conference may invite the terminal device a to share a screen by using a terminal device (namely, the chair terminal device) of the chairman. In this case, a user to which the terminal device a belongs is not the chairman of the conference (the chairman may also be referred to as a moderator of the conference). It is assumed that a terminal device d in a same conference as the terminal device a, the terminal device b, and the terminal device c is the chair terminal device.

For example, before step S101, the web conferencing system may receive a first sharing request instruction from the terminal device d. The first sharing request instruction requests the terminal device a to share a screen. In an example, the chairman may trigger, by using a screen sharing control that is in a user interface of the web conferencing system and that is displayed on the terminal device d, to send the first sharing request instruction to the web conferencing system. The web conferencing system may send the first sharing request instruction to the terminal device a. For example, the web conferencing system may display, in a user interface of the terminal device a in a form of a card, whether to agree to the screen sharing.

If the user to which the terminal device a belongs agrees to share the screen, the terminal device a may send a first sharing response instruction to the web conferencing system, to instruct that the terminal device a agrees to share the screen. Correspondingly, the web conferencing system may receive the first sharing response instruction. For example, the terminal device a may send the first sharing response instruction to the web conferencing system by using, for example, an "agree" or "yes" button corresponding to "display, in the user interface, whether to agree to share the screen". The web conferencing system may send the first sharing response instruction to the terminal device d. For example, the web conferencing system may display, in a user interface of the terminal device d in a form of a card, whether the terminal device a agrees to share the screen. In addition, the web conferencing system may control the sharing terminal device to enter the screen sharing mode.

Manner 2: The sharing terminal device can enter the screen sharing mode according to a control instruction of the sharing terminal device.

In a possible implementation, if a user to which the terminal device a belongs is not a chairman of the conference, the terminal device a may actively make a request to a chair terminal device in the conference, to share a screen.

For example, before step S101, the web conferencing system may receive a second sharing request instruction from the terminal device a. The second sharing request instruction requests to share the screen. In an example, the user of the terminal device a may trigger, by using a screen sharing control that is in a user interface of the web conferencing system and that is displayed on the terminal device a, to send the second sharing request instruction to the web conferencing system. The web conferencing system may send the second sharing request instruction to the terminal device d. For example, the web conferencing system may display, in a user interface of the terminal device d in a form of a card, whether to agree with the terminal device a on sharing the screen.

If the chairman agrees with the terminal device a on sharing the screen, the terminal device d may send a second sharing response instruction to the web conferencing system, to instruct that the terminal device d agrees with the terminal device a on sharing the screen. Correspondingly, the web conferencing system may receive the second sharing response instruction. For example, the terminal device d may send the second sharing response instruction to the web conferencing system by using, for example, an "agree" or "yes" button corresponding to "display, in the user interface, whether to agree with the terminal device a on sharing the screen". The web conferencing system may send the second sharing response instruction to the terminal device a. For example, the web conferencing system may display, in a user interface of the terminal device a in a form of a card, "the chairman has agreed to screen sharing". In addition, the web conferencing system may control the sharing terminal device to enter the screen sharing mode.

In another possible implementation, the terminal device a directly initiates the screen sharing. In these implementations, a user to which the terminal device a belongs may be a chairman of the conference, or may be not a chairman of the conference. This is not limited to some embodiments.

For example, before step S101, the web conferencing system may receive a sharing instruction from the terminal device a, to instruct the terminal device a to start sharing a screen. The web conferencing system may control the sharing terminal device to enter the screen sharing mode.

It should be understood that the foregoing manner describes how to trigger the terminal device a to share a screen, that is, the terminal device a may share the screen of the terminal device a. What information is specifically shared by the terminal device a is determined by the user to which the terminal device a belongs when performing screen sharing. In addition, the foregoing terminal device d is also a participating terminal device in the conference. Similar to another participating terminal device, the terminal device d also receives the screen sharing information a of the terminal device a and the screen sharing information b of the terminal device b that are distributed by the web conferencing system.

After the terminal device a is triggered to share a screen, the web conferencing system may establish a data transmission channel with the terminal device a. The terminal device a may, through the data transmission channel, send the screen sharing information a of the terminal device a to the web conferencing system, or receive the screen sharing information a shared by the terminal device a and the screen sharing information b shared by the terminal device b that are distributed by the web conferencing system. To be specific, the terminal device a may send or receive a data stream of screen sharing information, of all sharing terminal devices in the conference, distributed by the web conferencing system. For example, the web conferencing system may first establish a network connection to the terminal device a, to obtain a display parameter and a transmission parameter of the terminal device a. The display parameter herein may include a screen resolution of the terminal device a, for example, 1080p, 2K, 4K, and the like. The transmission parameter may include, for example, an IP address of the terminal device a, a media stream bit rate, and the like. The web conferencing system establishes the data transmission channel with the terminal device a based on the display parameter and the transmission parameter of the terminal device a. In this way, when subsequently distributing, to the terminal device a, the data stream of the screen sharing information of all the sharing terminal devices in the conference, the web conferencing system may process the distributed data stream based on the display parameter and the transmission parameter of the terminal device a, to ensure a display effect and transmission efficiency of the terminal device a. Certainly, the web conferencing system may alternatively establish the data transmission channel with the terminal device a in another manner in the conventional technology, to implement the foregoing functions. This is not limited.

The web conferencing system shown in FIG. 3 is used as an example. It is assumed that the web conferencing system is a web conferencing system, and the chair terminal device invites the terminal device a to share a screen. The user to which the terminal device a belongs is a user a. In this example, the terminal device a may share a screen in the following manner.

Specifically, the chair terminal device may send, to the web conferencing system, an instruction for inviting the user a to share a screen. After receiving the instruction, the user interface module 11 of the web conferencing system queries information (for example, an ID of the user a) about the user a. The web conferencing system may send "an instruction for inviting the user a to share a screen" to a terminal device of the user a by using the data transmission module 13 through an HTTP protocol, and the terminal device of the user a responds after receiving the instruction. In this example, a response of the user a is agreeing to share a screen.

After the user a agrees to share the screen, the sharing module 12 of the web conferencing system may query a database of the web conferencing system by using a conference ID, to obtain information, for example, an ID of a user, about all current participants in the conference. The sharing module 12 of the web conferencing system may establish a data transmission channel with the terminal device (namely, the participating terminal device) of the participant by using the data transmission module 13. In other words, the data transmission module 13 of the web conferencing system establishes a data transmission channel with each participating terminal device. Optionally, the sharing module 12 of the web conferencing system may further obtain, from the database, statuses (for example, online or away) of all current participants in the conference. In this way, the sharing module 12 of the web conferencing system may establish a data transmission channel with a terminal device (namely, the participating terminal device) of an online participant by using the data transmission module 13. This reduces a data distribution amount.

The user a is used as an example. For example, the terminal device a may first create a socket connection to the web conferencing system. After successfully creating the socket connection, the terminal device a may create a local description, set the display parameter and the transmission parameter to the local description, and add the local description to the socket connection. The terminal device a may send the socket connection to the web conferencing system. In this way, after receiving the socket connection, the data transmission module 13 of the web conferencing system may create the data transmission channel (pipeline) with the terminal device a based on the display parameter and the transmission parameter of the terminal device a, to transmit data with the terminal device a (for example, receive the screen sharing information a shared by the terminal device a, and distribute the screen sharing information a shared by the terminal device a and the screen sharing information b shared by the terminal device b to the terminal device a). After the data transmission channel is created, the data transmission module 13 of the web conferencing system may return, to the terminal device a, an instruction instructing that the data transmission channel is successfully created, so that the terminal device a learns that the data transmission channel is successfully created.

After the data transmission module 13 of the web conferencing system establishes the data transmission channel with each participating terminal device, the sharing module 12 of the web conferencing system may distribute, by using the data transmission module 13 at a specific frame rate (for example, at 0 Hz-120 Hz, when the screen sharing information a and the screen sharing information b do not change, the frame rate is 0; and when the screen sharing information a and/or the screen sharing information b change/changes, the frame rate continuously increases), the screen sharing information b of the terminal device b and a data stream of the screen sharing information a of the terminal device a to the participating terminal device in the conference. After receiving the screen sharing information b and the data stream of the screen sharing information a, the participating terminal device in the conference performs rendering in the user interface of the participating terminal device, to view the screen sharing information a and the screen sharing information b. In this way, the screen sharing is implemented.

Although the terminal device a in the foregoing embodiment is used as an example to describe how to implement the screen sharing, a person skilled in the art may understand that the terminal device a may also implement the screen sharing in another manner in the conventional technology. Correspondingly, another terminal device (for example, the terminal device b) in the conference may also implement the screen sharing in a manner similar to the manner used by the terminal device a. Details are not described again.

According to the information processing method provided in some embodiments of the application, when a plurality of users join a web conference by using the web conferencing system, the plurality of users may simultaneously share screens by using the web conferencing system, without waiting for another user in the conference to complete screen sharing. In other words, the web conferencing system can implement information sharing between a plurality of users and a plurality of terminal devices, so that information is conveniently shared between the plurality of users at the same time, and communication efficiency between the users is improved.

Embodiment of this application further provide for an information processing method, so that when a user shares a screen by using a web conferencing system, a plurality of users can comment on shared information online. It should be understood that screen sharing herein may be, for example, the foregoing multi-screen sharing scenario, or may be a single-screen sharing scenario in the conventional technology. This is not limited to some embodiments. In other words, some embodiments of the application is not dependent on multi-screen sharing, and may be an independent embodiment. Some embodiments of the application may be applied to any scenario of shared information commenting.

In the following embodiments, the foregoing multi-screen sharing scenario is used as an example to describe how to implement multi-user online commenting.

Figure 10:
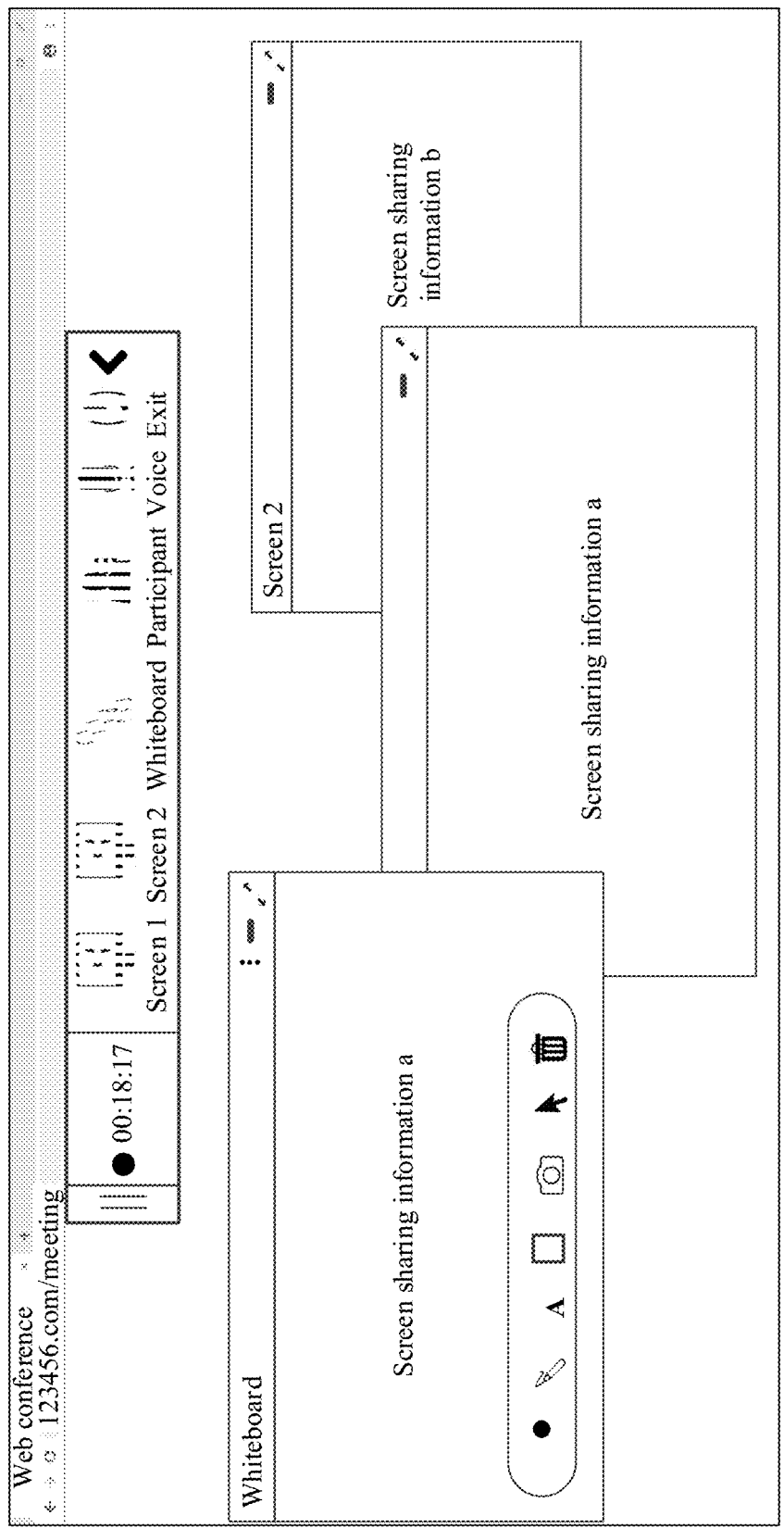
FIG. 10 is a schematic diagram 3 of a user interface according to an embodiment of this application.

FIG. 10 is a schematic diagram 3 of a user interface according to embodiments of this application. As shown in FIG. 10, an example in which the terminal device a and the terminal device b simultaneously share screens is still used. In this case, a participating terminal device in a conference may enter a comment mode of a target object in the following manner. When the participating terminal device enters the comment mode, the target object herein may be the screen sharing information a that is being shared by the terminal device a, may be the screen sharing information b that is being shared by the terminal device b, or may include the screen sharing information a and the screen sharing information b that are being shared. FIG. 10 is a schematic diagram of an example in which the target object is the screen sharing information a. To be specific, the target object includes screen sharing information of at least one sharing terminal device.

A first participating terminal device in the conference is used as an example. A user of the first participating terminal device may trigger the first participating terminal device to send a comment instruction to a web conferencing system, to request to comment on the target object. For example, a button (for example, a whiteboard button shown in FIG. 10) for triggering the comment is disposed in a user interface of the first participating terminal device. The whiteboard button may be associated with a drop-down menu, and the drop-down menu may include an identifier of the target object. The user of the first participating terminal device may trigger the comment instruction for the target object by selecting the identifier of the target object.

Alternatively, the user interface of the first participating terminal device may include a drawing board (for example, the whiteboard in FIG. 10) displayed by using a card. The user may copy the target object to the drawing board (for example, the whiteboard in FIG. 10), to trigger the comment instruction for the target object.

After receiving the comment instruction, the web conferencing system may send, to all participating terminal devices in the conference, the comment instruction, the drawing board, and an image, of the target object, used to be rendered to the drawing board. For example, the target object is the screen sharing information a of the terminal device a. In this case, the web conferencing system may, for example, take a screenshot of the screen sharing information a, to obtain the image of the target object. In this way, all the participating terminal devices in the conference may render the image of the target object to the drawing board, and then present the image in the user interface, for example, the user interface shown in FIG. 10, of the participating terminal device. In this case, all the participating terminal devices in the conference enter the comment mode of the target object.

It should be understood that the first participating terminal device herein may be any participating terminal device in the conference.

In a possible implementation, the comment instruction may include the identifier of the target object. In this way, after the web conferencing system sends the comment instruction to all the participating terminal devices in the conference, the participating terminal device may load the drawing board based on the identifier of the target object, and render the image of the target object to the drawing board, to enter the comment mode of the target object, for example, as shown in the user interface in FIG. 10.

It should be noted that cards are overlaid in the user interface shown in FIG. 10. However, in some implementations, sizes of the cards in the user interface may be set based on a requirement of the user. When the sizes of the cards are properly set, all information on the cards may be presented in the user interface. In this case, the cards are not overlaid. Certainly, when a terminal device has a plurality of screens, comment information and screen sharing information shared by the sharing terminal device in the conference may be displayed on different screens, or the like. This is not limited to some embodiments.

After all the participating terminal devices in the conference enter the comment mode of the target object, all participants can comment on the target object online and in real time. For example, one user draws a circle, another user enters a paragraph of text, and still another user draws a line. In other words, although the first participating terminal device triggers all the participating terminal devices to enter the comment mode of the target object, all the participants may comment on the target object by using their own terminal devices. For example, the first participating terminal device or a second participating terminal device (namely, a participating terminal device other than the first participating terminal device in the conference).

Figure 11:
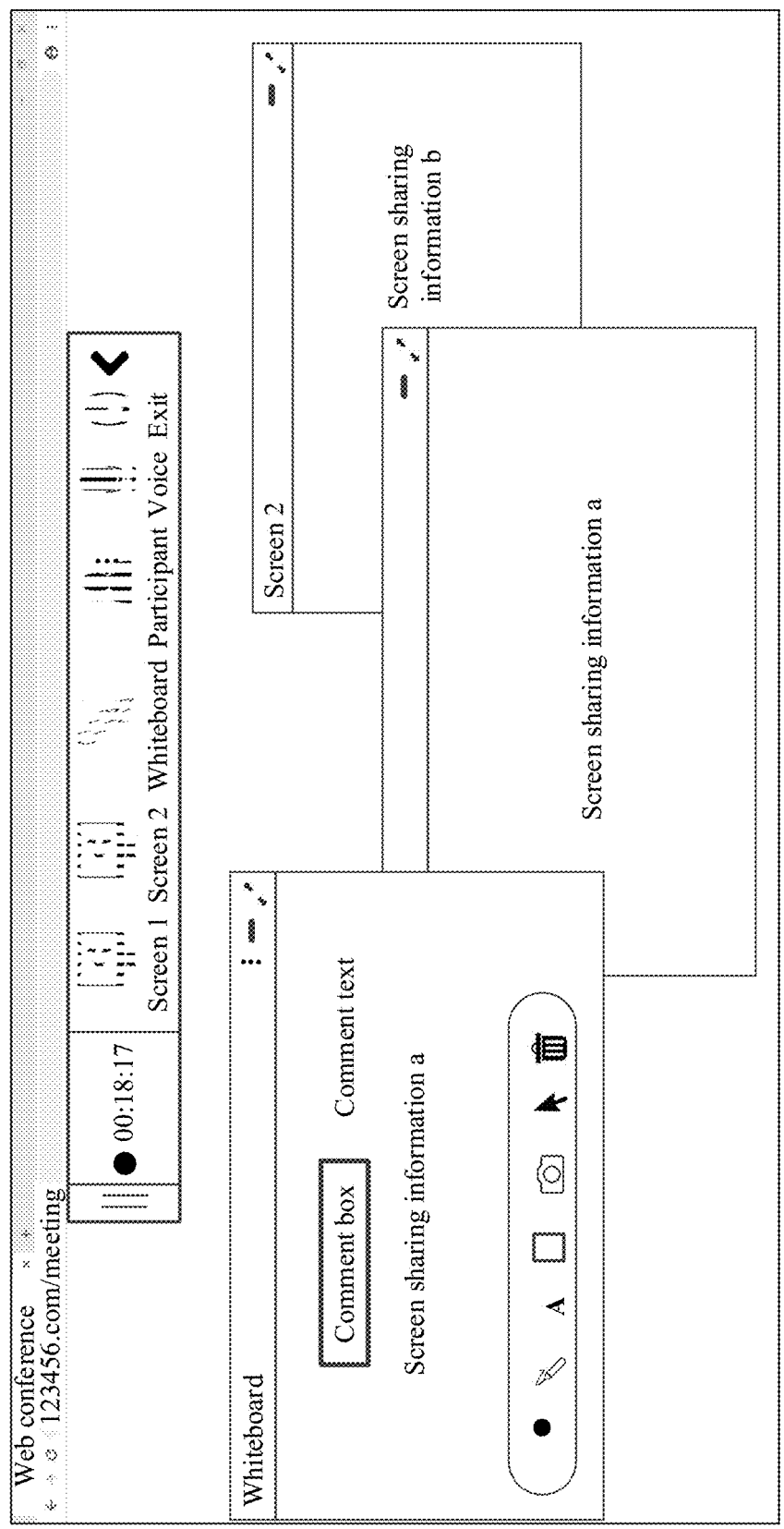
FIG. 11 is a schematic diagram 4 of a user interface according to an embodiment of this application.

FIG. 11 is a schematic diagram 4 of a user interface according to an embodiment of this application. FIG. 11 shows an example in which a user m comments on the screen sharing information a by using the second participating terminal device. The user m may comment on an image of the screen sharing information a on a drawing board displayed in a user interface of the second participating terminal device. For example, the user m draws a rectangular circle (for example, a comment box in FIG. 11) on the image of the screen sharing information a, and enters a paragraph of text (for example, "comment text" in FIG. 11).

In these cases, the second participating terminal device may send, to the web conferencing system based on the comment made by the user m on the screen sharing information a, comment information for the comment, to indicate the comment marked on the image of the target object by the user corresponding to the second participating terminal device. Therefore, the comment is presented on drawing boards displayed on user interfaces of all the terminal devices in the conference. For example, the comment information may include the comment on the image of the screen sharing information a. The comment, on the image of the screen sharing information a, described herein may be represented, for example, by using a track used in the comment on the image of the screen sharing information a, or represented by a plurality of sampling positions obtained by sampling the track. In a possible implementation, the comment may be further represented by using a start location of the comment on the image of the screen sharing information a, an end location of the comment on the image of the screen sharing information a, and a type of the comment (for example, a 200 mm×300 mm rectangle, and the like).

Correspondingly, after receiving the comment information sent by the second participating terminal device, the web conferencing system may send the comment information to all the participating terminal devices in the conference. In this way, the user interfaces of all the participating terminal devices in the conference can present the comment made by the second participating terminal device on the screen sharing information a.

Optionally, the comment information may further include at least one piece of the following information: the drawing board, the image of the screen sharing information a, and an identifier of a user that comments on the image of the screen sharing information a.

Further, if another participant comments on the screen sharing information a in a user interface of a terminal device of another participant, comment information may also be distributed to the participating terminal device in the conference by using the web conferencing system in the foregoing manner. In this way, another participating terminal device synchronously displays the comment. This makes the comment visible to all users in the conference.

The web conferencing system shown in FIG. 3 is used as an example. It is assumed that the web conferencing system is a web conferencing system, and the second participating terminal device is triggered to enter a comment mode of the screen sharing information a. A user to which the second participating terminal device belongs is the user m. In this example, the second participating terminal device may enter the comment mode of the screen sharing information a in the following manner.

Specifically, the user m initiates a comment instruction for the screen sharing information a by using the second participating terminal device of the user m. Correspondingly, after receiving the instruction, the user interface module 11 of the web conferencing system may invoke the comment module 14. The comment module 14 converts, for example, the screen sharing information a that is currently being shared from a media stream into an image by using, for example, a canvas2D drawing method, and invokes a canvas initialization method of FabricJS to generate a drawing board, to render the image of the screen sharing information a. It should be understood that the method for generating the drawing board and the method for converting the screen sharing information a into the image described herein are merely examples, and may also be implemented in other manners in specific implementations. This is not limited to these examples.

The web conferencing system may distribute, by using the data transmission module 13, the drawing board and the image to all participating terminal devices in the current conference by using data transmission channels established between the web conferencing system and the participating terminal devices. In this way, after receiving the drawing board and the image, the participating terminal device in the conference may render, in the user interface of the participating terminal device, the image on the drawing board.

In this way, all the participating terminal devices in the conference enter the comment mode of the screen sharing information a, and all participants may comment on the screen sharing information a online and in real time. For example, one user draws a circle, another user enters a paragraph of text, and still another user draws a line. Each user may invoke, by using writing and drawing operations performed by the user in a user interface of a terminal device of the user on the screen sharing information a, the canvas2D drawing method of the comment module 14 of the web conferencing system, and record pixel coordinates of a start location and an end location that are of the writing and drawing operations, and types of the comment (a circle, a box, a line, an arrow, a text box, and the like). The information may be distributed to all the participating terminal devices in the conference by using the data transmission module 13 of the web conferencing system. Therefore, the participating terminal device in the conference draws a corresponding shape based on the information, and presents the shape to the user in the user interface. This implements real-time online interactive discussion between a pluralities of persons.

For example, the target object is the screen sharing information a. As shown in FIG. 10 or FIG. 11, in some embodiments of the application, when the screen sharing information a is commented on, the image of the screen sharing information a is commented on. Therefore, when participants in the conference comments on the image, the screen sharing information a of the terminal device a may be changed to other content.

Figure 12:
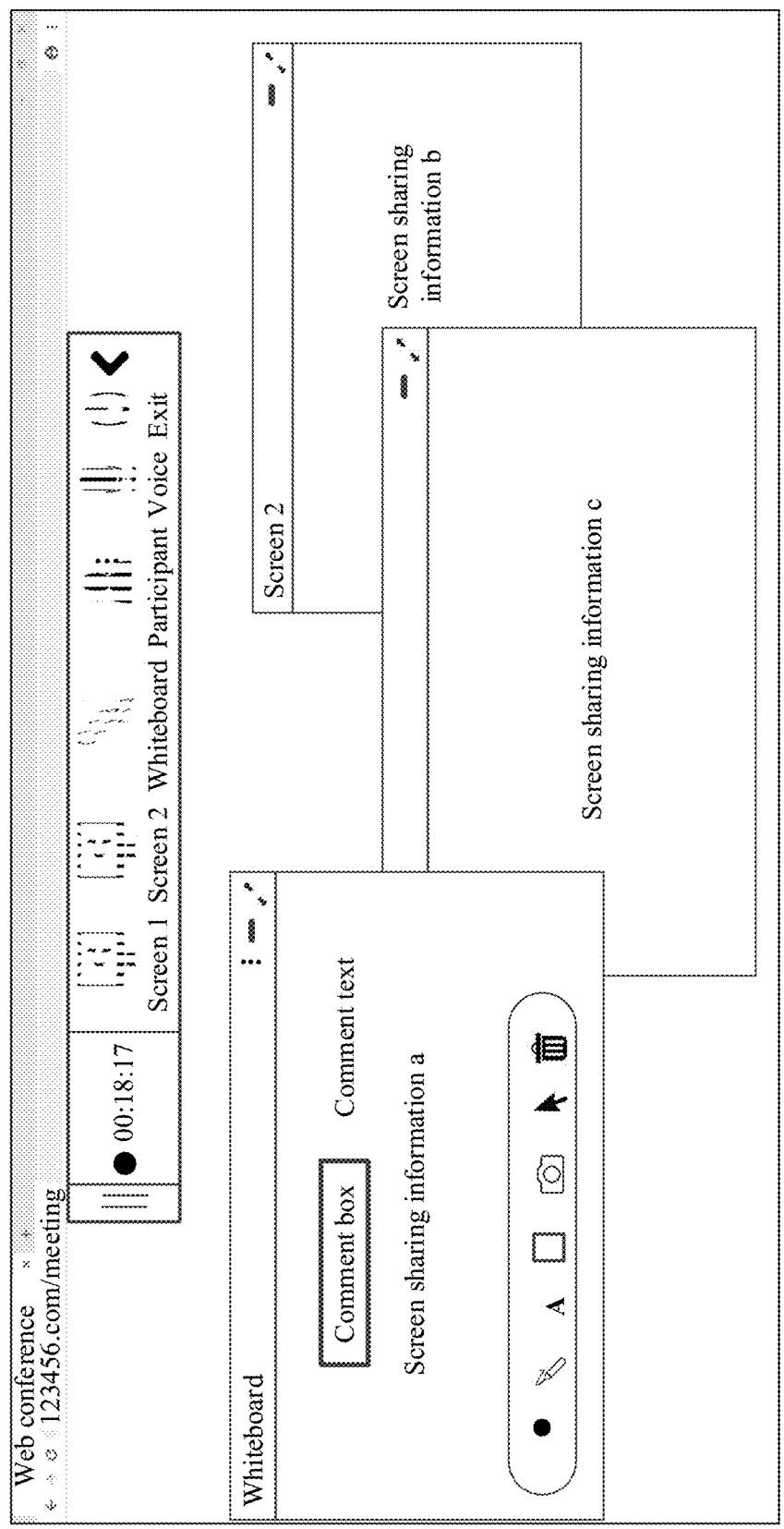
FIG. 12 is a schematic diagram 5 of a user interface according to an embodiment of this application.

FIG. 12 is a schematic diagram 5 of a user interface according to an embodiment of this application. With reference to FIG. 11 and FIG. 12, when the participants in the conference comments on the image of the screen sharing information a, the terminal device a may change the screen sharing information a to screen sharing information c. In this case, the participants in the conference can still comment on the image of the screen sharing information a. This improves information sharing efficiency and comment efficiency, and improves communication efficiency between the users.

For example, the screen sharing information a shared by the terminal device a is the third page of a document. It is assumed that a user in the conference triggers a comment on the third page of the document. When the participant comments on the third page of the document, the terminal device a may turn the document to the fourth page. In this case, screens 1 of terminal devices of all the participants display the fourth page of the document, and whiteboards display the comment on the third page of the document.

For example, the screen sharing information a shared by the terminal device a is the third page of a document. It is assumed that a user in the conference triggers a comment on the third page of the document. When the participant comments on the third page of the document, the terminal device a may change shared content from the document to a web page. In this case, screens 1 of terminal devices of all the participants display the shared web page, and whiteboards display the comment on the third page of the document.

Figure 13:
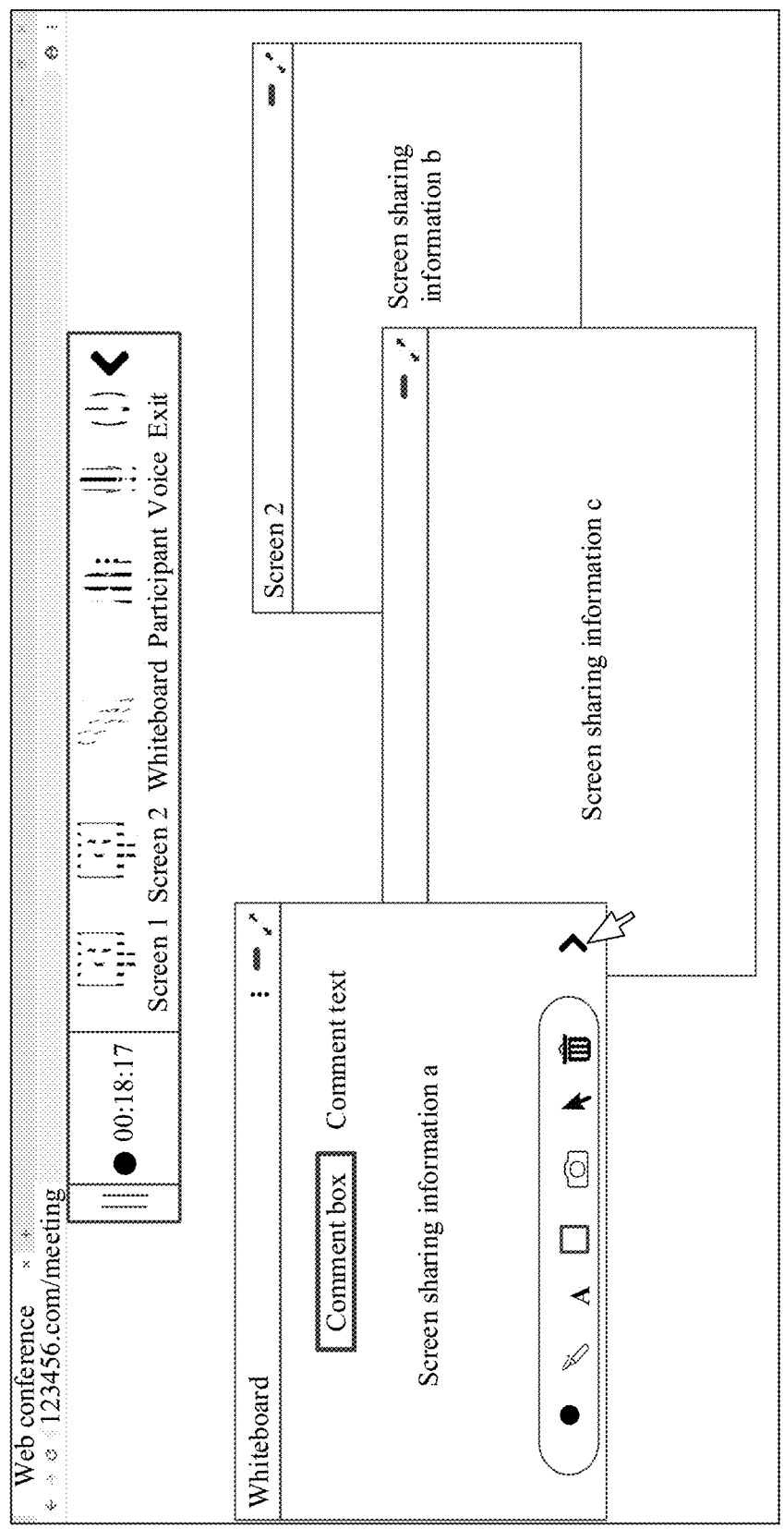
FIG. 13 is a schematic diagram 6 of a user interface according to an embodiment of this application.

FIG. 13 is a schematic diagram 6 of a user interface according to an embodiment of this application. As shown in FIG. 13, when the participants in the conference comments on the screen sharing information a of the terminal device a, any user in the conference may further trigger a comment mode of a new target object by using a terminal device of the user. In this case, an image of the new target object may be rendered on the whiteboard of the participants in the conference. The participants in the conference can switch between comment modes of two target objects by using a page turning function of the whiteboard.

For example, it is assumed that a comment mode of the screen sharing information b of the terminal device b is triggered when the screen sharing information a of the terminal device a is commented on. The participants in the conference may also enter the comment mode of the screen sharing information b in the manner described above. In this case, based on that the image of the screen sharing information a is displayed on the whiteboards of all the participants in the conference, an image of the screen sharing information b may be rendered. The participants in the conference can click a page turning button on the whiteboard to comment on the screen sharing information a or the screen sharing information b.

Figure 14:
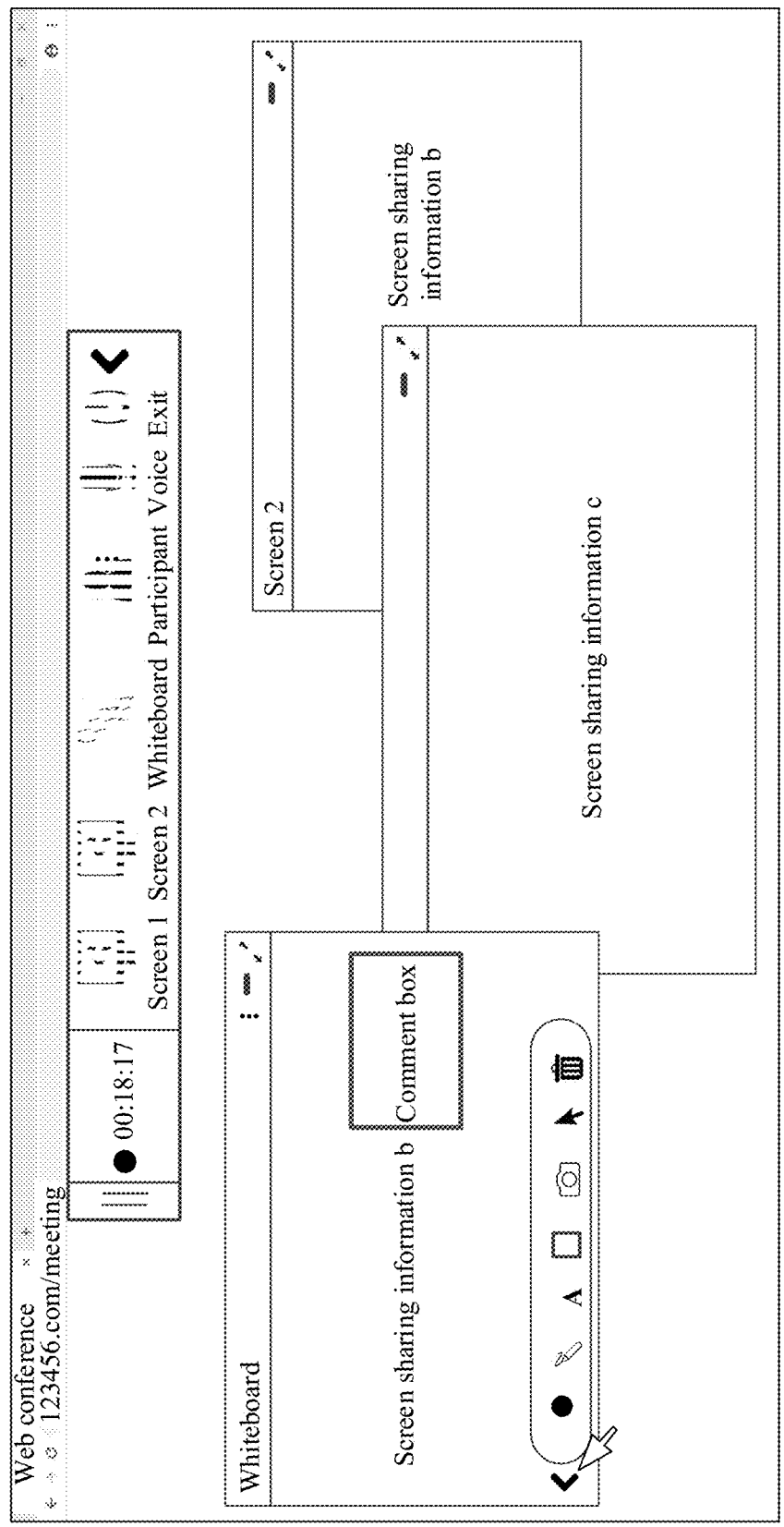
FIG. 14 is a schematic diagram 7 of a user interface according to an embodiment of this application.

FIG. 14 is a schematic diagram 7 of a user interface according to an embodiment of this application. With reference to FIG. 13 and FIG. 14, for example, when needing to comment on the screen sharing information b, the user may jump to the interface shown in FIG. 14 by clicking a button at which a mouse cursor in FIG. 13 is located, to comment on the screen sharing information b. When needing to comment on the screen sharing information a, the user may jump to the interface shown in FIG. 13 by clicking a button to which a mouse cursor in FIG. 14 points, to comment on the screen sharing information a.

It should be noted that, when the user in the conference triggers comment modes of a plurality of target objects, an image, of a target object, displayed on a whiteboard of a user interface of a terminal device of each user may be determined based on an object that the user needs to comment on or a target object that the user needs to view. In other words, when the comment modes of the plurality of target objects are triggered, images of target objects displayed on the whiteboards of the user interfaces of the terminal devices of the users in the conference may be different, but comments on the target objects are still synchronized in real time.

For example, it is assumed that when a user 7 comments the image of the screen sharing information b, a user S newly adds a comment to the image of the screen sharing information a. When a whiteboard of a user interface of a terminal device of the user 7 jumps to the image of the screen sharing information a, the user 7 can view comments, of all users, on the screen sharing information a, including the comment newly added by the user 8 to the screen sharing information a.

In addition, in the foregoing comment mode of the target object, if a participant in the conference does not want to make comments, the user may also choose to minimize or close a drawing board in a user interface of the user. In this case, the drawing board is not displayed in the user interface of a terminal device of the user, but the terminal device of the user still receives comment information that is of the target object and that is distributed by the web conferencing system. When the user opens the drawing board again, all information about a comment made by a participant on the target object can be viewed.

According to the information processing method provided in some embodiments of the application, when a plurality of users join a web conference by using the web conferencing system, the plurality of users may comment, online, on information shared in the conference. This improves communication efficiency between the users.

An embodiment of this application further provides an information processing method. When a user comments on shared information by using the web conferencing system, comment information may be stored in a structured manner.

It should be understood that the scenario, described herein, of commenting on the shared information may be, for example, a scenario in which commenting is performed in the foregoing manner, or may be a scenario in which commenting is performed by using a web conferencing system in the conventional technology. This is not limited to some embodiments. In other words, some embodiments of the application are not dependent on multi-screen sharing and the foregoing described commenting method, and may be an independent embodiment. Some embodiments of the application may be applied to any scenario of shared information commenting.

In the following embodiment, the foregoing described commenting scenario is used as an example to describe how to implement structured storage of comment information.

In some embodiments, when any user in a conference triggers, by using a terminal device, to enter a comment mode of a target object, the data management module 15 of the web conferencing system may store, into a comment table of the database, an image of the target object and an ID of the conference. The comment table may be a comment table corresponding to the ID of the conference, or may be a general comment table, that is, comments of all conferences are stored in the table.

When a participant comments on the image of the target object, the data management module 15 of the web conferencing system may store each comment in the comment table of the database in an independent object manner, to implement structured storage of comments. For example, information, stored for a comment, in the comment table is as follows: the ID of the conference, an ID of a drawing board, an ID of the image of the target object, an ID of the comment, a start location of the comment on the image of the target object, an end location of the comment on the image of the target object, and a type of the comment. Content allocated with an ID is an independent object. Certainly, another structured storage manner may also be used to store each comment.

In this way, a comment can be associated with shared information, so that a user can subsequently trace, reverse locate, and view comment information by using an ID of an independent object. For example, after the conference ends, the user can view all content of the comments in the conference by using the ID of the conference.

According to the information processing method provided in some embodiments of the application, when a plurality of users join a web conference by using a web conferencing system, if a user comments on information shared in the conference, the comment information may be stored in the structured manner. This facilitates tracing, reverse locating, and viewing of the comment information, and improves work efficiency between the users.

This application further provides the web conferencing system 100 shown in FIG. 3. Modules and functions included in the web conferencing system are similar to foregoing description. When each module is used to implement the method in some embodiments of the application, each functional module may, for example, specifically perform the following operations.

The sharing module 12 is configured to receive, by using the data transmission module 13, a data stream, in a conference, of screen sharing information from at least two sharing terminal devices, and distribute the data stream of the screen sharing information of the at least two sharing terminal devices to all participating terminal devices in the conference. All participating terminal devices in the conference include the at least two sharing terminal devices.

In a possible implementation, the sharing terminal device may be triggered to share a screen in the following manner.

For example, if the participating terminal devices in the conference include a chair terminal device, the user interface module 11 is configured to before the sharing module 12 receives, by using the data transmission module 13, the data stream of the screen sharing information from the at least two sharing terminal devices in the conference, receive a first sharing request instruction from the chair terminal device. The first sharing request instruction requests the sharing terminal device to share a screen. The sharing module 12 is further configured to send the first sharing request instruction to the sharing terminal device by using the data transmission module 13, and receive a first sharing response instruction sent by the sharing terminal device. The first sharing response instruction is used to indicate that the sharing terminal device agrees to share the screen. The user interface module 11 is further configured to send the first sharing response instruction to the chair terminal device.

For another example, the participating terminal devices in the conference include a chair terminal device. The user interface module 11 is configured to before the sharing module 12 receives, by using the data transmission module 13, the data stream of the screen sharing information from the at least two sharing terminal devices in the conference, receive a second sharing request instruction from the sharing terminal device. The second sharing request instruction requests to share a screen. The sharing module 12 is further configured to send the second sharing request instruction to the chair terminal device by using the data transmission module 13, and receive a second sharing response instruction sent by the chair terminal device. The second sharing response instruction is used to indicate that the chair terminal device agrees with the sharing terminal device on sharing the screen. The user interface module 11 is further configured to send the second sharing response instruction to the sharing terminal device.

For another example, the user interface module 11 is configured to before the sharing module 12 receives, by using the data transmission module 13, the data stream of the screen sharing information from the at least two sharing terminal devices in the conference, receive a sharing instruction from the sharing terminal device. The sharing instruction instructs the sharing terminal device to start to share the screen.

In a possible implementation, the data transmission module 13 is further configured to before the data stream of the screen sharing information is received from the sharing terminal device, establish a data transmission channel with the participating terminal device. For example, the data transmission module 13 is configured to establish a network connection to the participating terminal device, obtain a display parameter and a transmission parameter of the participating terminal device, and establish the data transmission channel with the participating terminal device based on the display parameter and the transmission parameter of the participating terminal device.

In a possible implementation, the user interface module 11 is further configured to receive a comment instruction sent by a first participating terminal device. The comment instruction is used to request to comment on a target object, and the target object includes screen sharing information of at least one sharing terminal device. The comment module 14 is configured to generate a drawing board, and obtain an image, of the target object, used to be rendered to the drawing board. The data transmission module 13 is configured to send the comment instruction, the drawing board, and the image of the target object to all participating terminal devices.

In a possible implementation, the user interface module 11 is further configured to receive comment information of the target object from the first participating terminal device or a second participating terminal device. The comment information is used to indicate a comment made on the image of the target object by a user corresponding to the first participating terminal device or the second participating terminal device. The data transmission module 13 is configured to send the comment information to all participating terminal devices. For example, the comment information includes a comment on the image of the target object. For example, the comment on the image of the target object includes a start location of the comment on the image of the target object, an end location of the comment on the image of the target object, and a type of the comment. Optionally, the comment information further includes at least one of the following: the drawing board, the image of the target object, or an identifier of a user that comments on the image of the target object.

In a possible implementation, the data management module 15 is configured to store the comment information in a structured manner.

This application further provides the computing device 200 shown in FIG. 6. The processor 202 in the computing device 200 reads a program and a dataset that are stored in the memory 201, to perform the information processing method performed by the foregoing web conferencing system.

Figure 15:
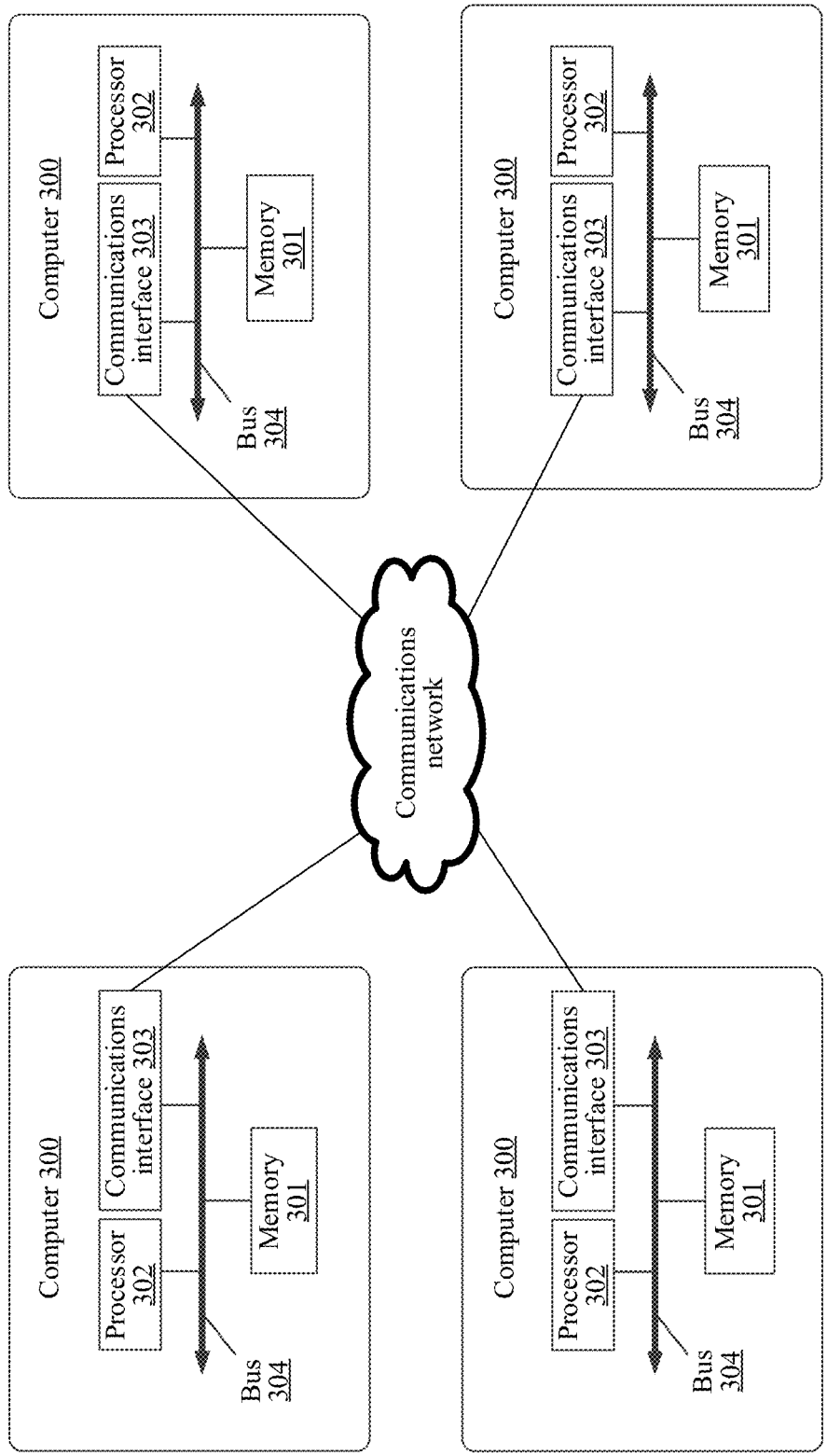
FIG. 15 is a schematic diagram of a structure of another computing device according to an embodiment of this application.

FIG. 15 is a schematic diagram of a structure of another computing device according to an embodiment of this application. Modules in the web conferencing system 100 provided in this application may be deployed, in a distributed manner, on a plurality of computers in a same environment or different environments. Therefore, this application further provides the computing device shown in FIG. 15. The computing device includes a plurality of computers 300. Each computer 300 includes a memory 301, a processor 302, a communications interface 303, and a bus 304. The memory 301, the processor 302, and the communications interface 303 are communicatively connected to each other through the bus 304.

The memory 301 may be a ROM, a static storage device, a dynamic storage device, or a RAM. The memory 301 may store a program. For example, the program may be a program corresponding to an operating system, so that the processor 302 may run the operating system by using the program in the memory 301. The operating system may be any one or more computer operating systems that implement service processing through a process, for example, a Linux operating system, a UNIX operating system, an Android operating system, an iOS operating system, or a Windows operating system.

The operating system may include at least one module in the network system shown in FIG. 3. Each module may include corresponding instructions, In other words, when the instructions, stored in the memory 301, of the at least one module in the web conferencing system 100 is executed by the processor 302, the processor 302 and the communications interface 303 are configured to perform some methods of the web conferencing system. For example, an operating system of the computer 300 includes all modules in the network system. In this case, the computer 300 may be equivalent to the computing device 200 shown in FIG. 6.

The processor 302 may be a general-purpose CPU, a microprocessor, an ASIC, a GPU, or one or more integrated circuits.

The processor 302 may be an integrated circuit chip and has a signal processing capability. In an implementation process, some or all functions of the web conferencing system in this application may be completed by using an integrated logic circuit of hardware in the processor 302 or instructions in a form of software. The processor 302 may be a general-purpose processor, a DSP, an ASIC, a FPGA or another programmable logic device, a discrete gate or transistor logic device, or a discrete hardware component. It may implement or perform the methods, the steps, and logical block diagrams that are disclosed in the foregoing embodiments of this application. The general-purpose processor may be a microprocessor, or the processor may be any conventional processor, or the like. Steps of the methods disclosed with reference to the embodiments of this application may be directly executed and completed by a hardware decoding processor, or may be executed and completed by using a combination of hardware and software modules in the decoding processor. A software module may be located in a mature storage medium in the art, such as a RAM, a flash memory, a ROM, a PROM, an EEPROM, or a register. The storage medium is located in the memory 301. The processor 302 reads information in the memory 301, and completes some functions of the web conferencing system in some embodiments of the application in combination with hardware of the processor 302.

The communications interface 303 is but is not limited to a transceiver module, for example, a transceiver, to implement communication between the computer 300 and another device or a communications network.

The bus 304 may include a path for transmitting information between components (for example, the memory 301, the processor 302, and the communications interface 303) of the computer 300.

A communication channel is established between the computers 300 by using a communications network. Any one or more of the user interface module 11, the sharing module 12, the comment module 13, the data transmission module 14, and the data management module 15 are run on the computers 300. Any computer 300 may be a computer (for example, a server) in a cloud data center, a computer in an edge data center, or a terminal computing device.

A description of a procedure corresponding to each of the accompanying drawings bas a focus. For a part that is not described in detail in a procedure, refer to a related description of another procedure.

All or some of the foregoing embodiments may be implemented by using software, hardware, firmware, or any combination thereof. When software is used to implement the embodiments, all or some of the embodiments may be implemented in a form of a computer program product. A computer program product providing the foregoing information processing method includes one or more computer instructions implementing the foregoing information processing method. When the computer program instructions are loaded and executed on a computer, all or some of the procedures or functions are generated according to the embodiments of this application.

The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

What is claimed is:

1. An information processing method applied to a web conferencing system, the method comprising:
    establishing a network connection to a plurality of participating terminal devices in the web conferencing system, and obtaining a display parameter and a transmission parameter of the plurality of participating terminal devices;
    establishing a data transmission channel with the plurality of participating terminal device based on the display parameter and the transmission parameter of the plurality of participating terminal devices;
    receiving a data stream of screen sharing information transmitted by at least two sharing terminal devices in a screen sharing mode, wherein each of the at least two sharing terminal devices is capable of controlling screen sharing; and
    distributing the data stream of the screen sharing information of the at least two sharing terminal devices to the plurality of participating terminal devices in a conference, to enable the plurality of participating terminal devices to display the screen sharing information shared by the at least two sharing terminal devices, wherein the plurality of participating terminal devices comprise the at least two sharing terminal devices.

2. The method according to claim 1, wherein the web conferencing system is a web conferencing system of a web version.

3. The method according to claim 1, wherein the plurality of participating terminal devices comprise a chair terminal device, and before the receiving of the data stream of the screen sharing information transmitted by the at least two sharing terminal devices in the screen sharing mode, the method further comprises:
    implementing, according to a first control instruction of the chair terminal device, that one of the at least two sharing terminal devices enters the screen sharing mode; or
    implementing, according to a second control instruction of one of the at least two sharing terminal devices, that the one of the at least two sharing terminal devices enters the screen sharing mode.

4. The method according to claim 1, wherein the method further comprises:
    controlling, according to a comment instruction of a first participating terminal device for a target object, the plurality of participating terminal devices to enter a comment mode of the target object, wherein the comment instruction is used to request to comment on the target object, the first participating terminal device is any one of the plurality of participating terminal devices, and the target object comprises the screen sharing information of at least one sharing terminal device of the at least two sharing terminal devices.

5. The method according to claim 4, wherein the controlling, according to the comment instruction that is of the first participating terminal device and that is for the target object, the plurality of participating terminal devices to enter the comment mode of the target object comprises:
    generating a drawing board according to the comment instruction, and obtaining an image of the target object to be rendered to the drawing board; and
    sending the comment instruction, the drawing board, and the image of the target object to the plurality of participating terminal devices, to enable the plurality of participating terminal devices to enter the comment mode of the target object.

6. The method according to claim 5, wherein the method further comprises:
    receiving, from a second participating terminal device, comment information of the target object, wherein the second participating terminal device is any one of the plurality of participating terminal devices; and
    sending the comment information to the plurality of participating terminal devices.

7. The method according to claim 6, wherein the comment information comprises a start location of a comment on the image of the target object, an end location of the comment on the image of the target object, and a type of the comment.

8. The method according to claim 7, wherein the comment information further comprises at least one of the following:
    the drawing board, the image of the target object, or an identifier of a user that comments on the image of the target object.

9. The method according to claim 6, wherein the method further comprises:
    allocating an identifier to the target object and storing the comment information with the identifier.

10. A computer program product, comprising a storage medium storing a computer program, wherein when the computer program is executed by a processor, the computer program implements the method according to claim 1.

11. The computer program product of claim 10, wherein the plurality of participating terminal devices comprise a chair terminal device, and before the receiving of the data stream of the screen sharing information transmitted by the at least two sharing terminal devices in the screen sharing mode, the method further comprises:
    implementing, according to a first control instruction of the chair terminal device, that one of the at least two sharing terminal devices enters the screen sharing mode; or
implementing, according to a second control instruction of the one of the at least two sharing terminal devices, that the one of the at least two sharing terminal devices enters the screen sharing mode.

12. The computer program product of claim 10, wherein when the computer program is executed by a processor, the computer program further implements:
    controlling, according to a comment instruction of a first participating terminal device for a target object, the plurality of participating terminal devices to enter a comment mode of the target object, wherein the comment instruction is used to request to comment on the target object, the first participating terminal device is any one of the plurality of participating terminal devices, and the target object comprises the screen sharing information of at least one sharing terminal device of the at least two sharing terminal devices.

13. A computing device, wherein the computing device comprises a memory and a processor, and the memory is configured to store a group of computer instructions; and
the processor executes the group of computer instructions stored in the memory, to perform:
establishing a network connection to a plurality of participating terminal devices in the web conferencing system, and obtaining a display parameter and a transmission parameter of the plurality of participating terminal devices;
establishing a data transmission channel with the plurality of participating terminal device based on the display parameter and the transmission parameter of the plurality of participating terminal devices;
receiving a data stream of screen sharing information transmitted by at least two sharing terminal devices in a screen sharing mode, wherein each of the at least two sharing terminal devices is capable of controlling screen sharing; and
distributing the data stream of the screen sharing information of the at least two sharing terminal devices to the plurality of participating terminal devices in a conference, to enable the plurality of participating terminal devices to display the screen sharing information shared by the at least two sharing terminal devices, wherein the plurality of participating terminal devices comprise the at least two sharing terminal devices.

14. The computing device of claim 13, wherein the plurality of participating terminal devices comprise a chair terminal device, and before the receiving of the data stream of the screen sharing information transmitted by the at least two sharing terminal devices in the screen sharing mode, the method further comprises:
implementing, according to a first control instruction of the chair terminal device, that one of the at least two sharing terminal devices enters the screen sharing mode; or
implementing, according to a second control instruction of the one of the at least two sharing terminal devices, that the one of the at least two sharing terminal devices enters the screen sharing mode.

15. The computing device of claim 13, wherein the processor executes the group of computer instructions stored in the memory to further perform:
controlling, according to a comment instruction of a first participating terminal device for a target object, the plurality of participating terminal devices to enter a comment mode of the target object, wherein the comment instruction is used to request to comment on the target object, the first participating terminal device is any one of the plurality of participating terminal devices, and the target object comprises the screen sharing information of at least one sharing terminal device of the at least two sharing terminal devices.

16. A non-transitory computer-readable storage medium, wherein the non-transitory computer-readable storage medium stores computer program code, and when the computer program code is executed by a computing device, the computing device performs the following:
establishing a network connection to a plurality of participating terminal devices in the web conferencing system, and obtaining a display parameter and a transmission parameter of the plurality of participating terminal devices;
establishing a data transmission channel with the plurality of participating terminal device based on the display parameter and the transmission parameter of the plurality of participating terminal devices;
receiving a data stream of screen sharing information transmitted by at least two sharing terminal devices in a screen sharing mode, wherein each of the at least two sharing terminal devices is capable of controlling screen sharing; and
distributing the data stream of the screen sharing information of the at least two sharing terminal devices to the plurality of participating terminal devices in a conference, to enable the plurality of participating terminal devices to display the screen sharing information shared by the at least two sharing terminal devices, wherein the plurality of participating terminal devices comprise the at least two sharing terminal devices.

17. The non-transitory computer-readable storage medium of claim 16, wherein the plurality of participating terminal devices comprise a chair terminal device, and before the receiving of the data stream of the screen sharing information transmitted by the at least two sharing terminal devices in the screen sharing mode, the method further comprises:
implementing, according to a first control instruction of the chair terminal device, that one of the at least two sharing terminal devices enters the screen sharing mode; or
implementing, according to a second control instruction of the one of the at least two sharing terminal devices, that the one of the at least two sharing terminal devices enters the screen sharing mode.

18. The non-transitory computer-readable storage medium of claim 16, wherein when the computer program code is executed by a computing device, the computing device further performs:
controlling, according to a comment instruction of a first participating terminal device for a target object, the plurality of participating terminal devices to enter a comment mode of the target object, wherein the comment instruction is used to request to comment on the target object, the first participating terminal device is any one of the plurality of participating terminal devices, and the target object comprises the screen sharing information of at least one sharing terminal device of the at least two sharing terminal devices.

* * * * *